United States Patent
Gormley et al.

(10) Patent No.: US 11,685,801 B2
(45) Date of Patent: Jun. 27, 2023

(54) DERIVATIZABLE MONOMERS AND POLYMERS, AND METHODS FOR MAKING AND USING SAME

(71) Applicant: Rutgers, The State University of New Jersey, New Brunswick, NJ (US)

(72) Inventors: Adam Gormley, Piscataway, NJ (US); Shashank Kosuri, Piscataway, NJ (US)

(73) Assignee: Rutgers, the State University of New Jersey, New Brunswick, NJ (US)

(*) Notice: Subject to any disclaimer, the term of this patent is extended or adjusted under 35 U.S.C. 154(b) by 130 days.

(21) Appl. No.: 17/290,793

(22) PCT Filed: Nov. 5, 2019

(86) PCT No.: PCT/US2019/059755
§ 371 (c)(1),
(2) Date: May 3, 2021

(87) PCT Pub. No.: WO2020/097005
PCT Pub. Date: May 14, 2020

(65) Prior Publication Data
US 2021/0388138 A1 Dec. 16, 2021

Related U.S. Application Data

(60) Provisional application No. 62/756,177, filed on Nov. 6, 2018.

(51) Int. Cl.
*C08F 220/60* (2006.01)
*C08F 220/38* (2006.01)
*C08F 2/48* (2006.01)
*C08F 8/30* (2006.01)
*C08F 220/36* (2006.01)

(52) U.S. Cl.
CPC ............ *C08F 220/603* (2020.02); *C08F 2/48* (2013.01); *C08F 8/30* (2013.01); *C08F 220/36* (2013.01); *C08F 220/387* (2020.02); *C08F 2438/03* (2013.01)

(58) Field of Classification Search
CPC .......... C08F 220/603; C08F 220/387; C08F 220/36; C08F 2/48; C08F 8/30; C08F 2438/03
See application file for complete search history.

(56) References Cited

U.S. PATENT DOCUMENTS

| 7,417,040 B2 | 8/2008 | Fink et al. |
| 2012/0053299 A1 | 3/2012 | Popik et al. |
| 2018/0023084 A1 | 1/2018 | Almeida et al. |

OTHER PUBLICATIONS

Friscourt et al. Polar Dibenzocyclooctynes for Selective Labeling of Extracellular Glycoconjugates of Living Cells. J. Am. Chem. Soc. 2012, 134, 11, 5381-5389 (Year: 2012).*
Chupakhin, et al., "Achievements in the synthesis of cyclooctynes for ring strain-promoted [3+2] azide-alkyne cycloaddition", Chemistry of Heterocyclic Compounds, vol. 54, No. 5, May 2018, pp. 483-501.
Dommerholt, et al., "Highly accelerated inverse electron-demand cycloaddition of electron-deficient azides with aliphatic cyclooctynes", Nature Communications, 5:5378, Nov. 10, 2014, pp. 1-7.
Xu, et al., "Cytocompatible Poly(ethylene glycol)-co-polycarbonate Hydrogels Cross-Linked by Copper-Free, Strain-Promoted Click Chemisrtry", Chem Asian J, vol. 6, 2011, pp. 2730-2737.
International Search Report and Written Opinion dated Jan. 21, 2020 for corresponding PCT International Application PCT/US2019/059755.

* cited by examiner

Primary Examiner — Sanza L. McClendon
(74) Attorney, Agent, or Firm — Saul Ewing LLP; Domingos J. Silva; Kevin T. O'Brien

(57) ABSTRACT

The invention provides UV-sensitive monomers, comprising a cyclopropenone-containing group, which acts as a masked dibenzocyclooctyne (DBCO)/dibenzoazocyclooctyne (DIBAC) group. The monomers of the invention can be polymerized for example via reversible addition fragmentation chain transfer (RAFT) polymerization techniques to yield a polymer comprising the masked DBCO/DIBAC group. In certain embodiments, the DBCO/DIBAC group can be unmasked under controlled conditions, allowing conjugation of small molecules and/or macromolecules to the polymer through highly selective and efficient strain-promoted azide alkyne click chemistry (SPAAC).

18 Claims, 17 Drawing Sheets

Step 1

Step 2

Step 3

Step 4

Step 5 propanethiol            cp-DIBAC                                    Michael adduct Molecular Weight (Da)

Molecular Weight (Da)

DERIVATIZABLE MONOMERS AND POLYMERS, AND METHODS FOR MAKING AND USING SAME

CROSS-REFERENCE TO RELATED APPLICATIONS

The present application is a 35 U.S.C. § 371 national phase application of, and claims priority to, International Application No. PCT/US2019/059755, filed Nov. 5, 2019, which claims priority under 35 U.S.C. § 119(e) to U.S. Provisional Patent Application No. 62/756,177, filed Nov. 6, 2018, all of which are whereby incorporated by reference in their entireties herein.

BACKGROUND OF THE INVENTION

Bioorthogonal "click" chemistry has revolutionized the field of bioconjugate chemistry, because it allows for controlled introduction of multiple bioactive groups in a single molecule. The "click" reaction paradigm is centered on the development and implementation of robust reactions that proceed with reliable control over the products formed. A "click" reaction should have the following characteristics: the reaction involves minimal set-up effort and the starting materials are readily available; the reaction is high yielding, proceeding with high stereospecificity and high atom economy; the reaction is run solvent-free or in an environmentally benign solvent (preferably water); the product can be easily isolated by crystallization or distillation, and preparative chromatography is not required; the by-products are easily removed and non-toxic; the reaction is physiologically compatible; and there is a large thermodynamic driving force (>84 kJ/mol) to favor the formation of a single reaction product.

One reaction that meets most of these criteria is the azide-alkyne Huisgen cycloaddition, which is a 1,3-dipolar cycloaddition between an azide and a terminal or internal alkyne to give a 1,2,3-triazole. A notable variant of the Huisgen 1,3-dipolar cycloaddition is the copper(I) catalyzed variant, in which organic azides and terminal alkynes are united to afford 1,4-regioisomers of 1,2,3-triazoles as sole products. This copper(I)-catalyzed variant reaction is formally not a 1,3-dipolar cycloaddition and thus should not be termed a Huisgen cycloaddition. Instead, this reaction is known as the copper(I)-catalyzed Azide-Alkyne Cycloaddition (CuAAC).

Strain promoted alkyne-azide cycloaddition (SPAAC) is particularly attractive as a click reaction, since SPAAC does not require the presence toxic catalysts for bioconjugation. For this reason, a variety of dibenzoazacyclooctyne groups (DIBACs; also known as azadibenzocyclooctynes or ADIBOs) and their derivatives have been developed for efficient bioconjugation to azides. Unfortunately, the intolerance of these functional groups to radical polymerization reactions necessitates multi-step post-polymerization modifications.

There is thus a need in the art to identify monomers and/or polymers that allow for controlled derivatization of a polymer with bioactive molecules. Such monomers and/or polymers should be used for applications such as therapeutic treatments, site-directed drug delivery, and/or bioengineering. The present invention addresses this unmet need in the art.

BRIEF SUMMARY OF THE INVENTION

The invention provides a compound comprising an α,β-unsaturated carboxamide group or α,β-unsaturated sulfonamide group conjugated to a group of formula (I):

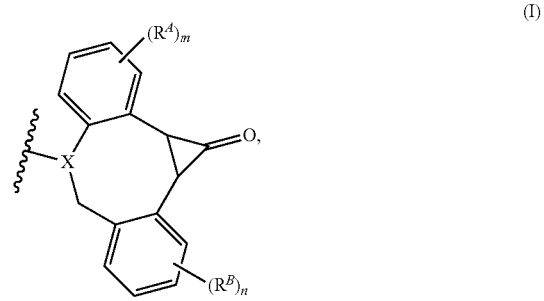

wherein the variables therein are defined elsewhere herein.

The invention further provides polymers comprising the at least partially polymerized compound of the invention.

The invention further provides a method of derivatizing at least a portion of the compound of the invention with a small molecule, therapeutic agent, or macromolecule.

The invention further provides a method of derivatizing at least a portion of the polymer of the invention with a small molecule, therapeutic agent, or macromolecule.

BRIEF DESCRIPTION OF THE DRAWINGS

The following detailed description of selected embodiments of the invention will be better understood when read in conjunction with the appended drawings. For the purpose of illustrating the invention, specific embodiments are illustrated in the drawings. It should be understood, however, that the invention is not limited to the precise arrangements and instrumentalities of the embodiments illustrated in the drawings.

FIG. 6A: UV-Vis traces of pDMA with 5% (mol) cp-DIBAC monomer (M1) incorporated at DP 200 and 400 before and after deprotection, and following click to 2 kDa PEG-$N_3$. FIG. 6B: Kinetics of PET-RAFT polymerization with and without cp-DIBAC monomer (M1) showing complete conversion in both cases after 16 h. FIG. 6C: GPC traces for pDMA with 5% (mol) cp-DIBAC monomer (M1) after 8, 12 and 16 h of polymerization, showing incorporation of the cp-DIBAC by UV detection at 265 nm.

FIG. 7A: DMA with 5% cp-DIBAC. FIG. 7B: HEA (2-hydroxyethyl acrylate) with 5% cp-DIBAC. FIG. 7C: DMA DP 200 with 2.5-7.5% cp-DIBAC. FIG. 7D: UV signal at 265 nm from GPC showing increasing incorporation of cp-DIBAC as a function of feed ratio.

FIG. 8A: GPC traces after copolymerization of DMA/NHS-acrylate/cp-DIBAC (95/2.5/2.5 mol %) and addition of DBCO—NH$_2$ to create dual SPAAC-ready polymers. Subsequent click to DBCO, deprotection and secondary click of 2 kDa PEG-N$_3$ to cp-DIBAC are also shown. FIG. 8B: UV-Vis traces of the protected polymer before and after the first DBCO click, after deprotection of the cp-DIBAC and after subsequent click to the DIBAC.

DETAILED DESCRIPTION OF THE INVENTION

Figure 1:
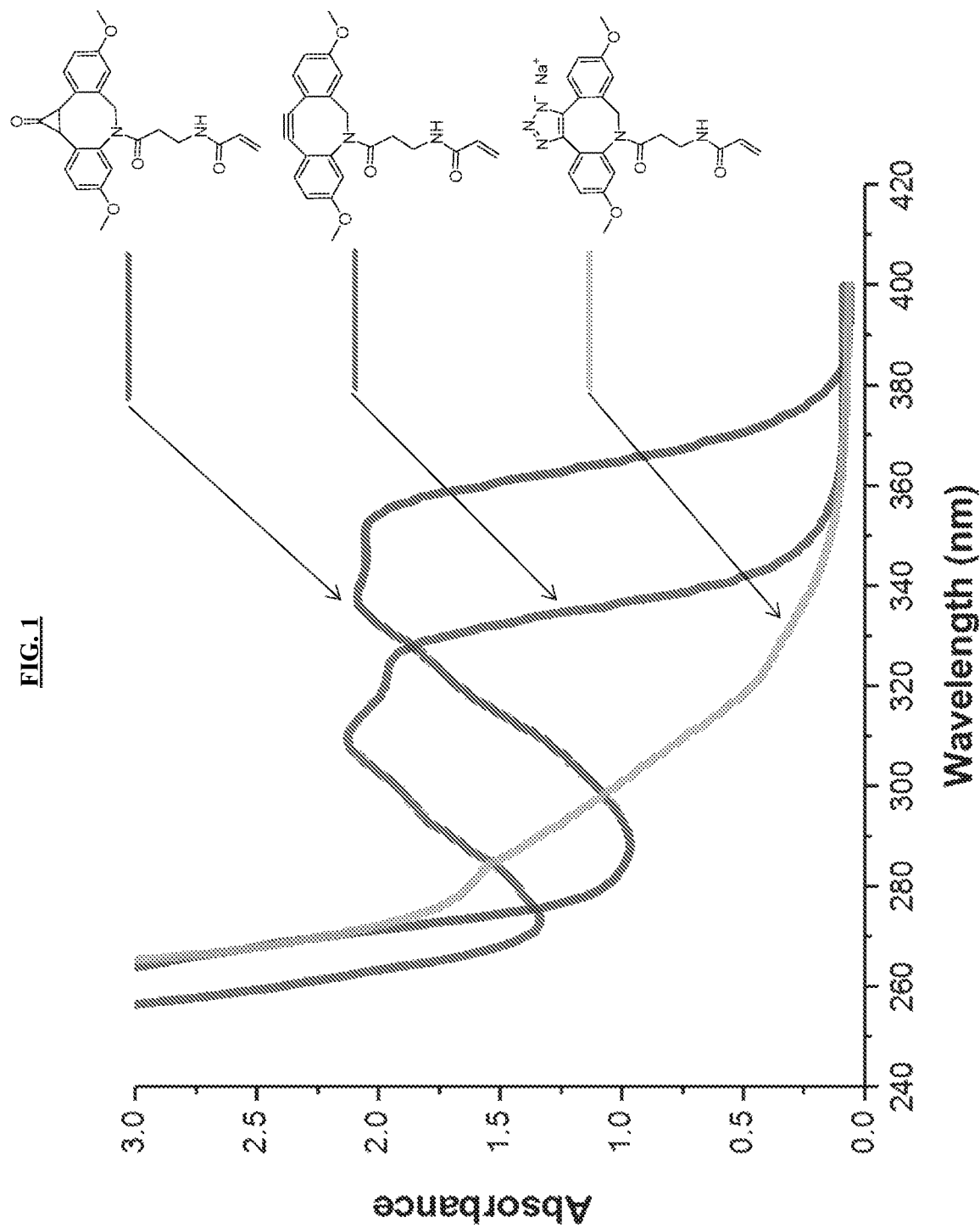
FIG. 1 is a graph illustrating UV-Vis of cp-DIBAC monomer (M1) before and after deprotection showing blue-shift of the characteristic peak, followed by a loss in absorbance after click to 2 kDa PEG-$N_3$ (SPAAC).
Figure 2:
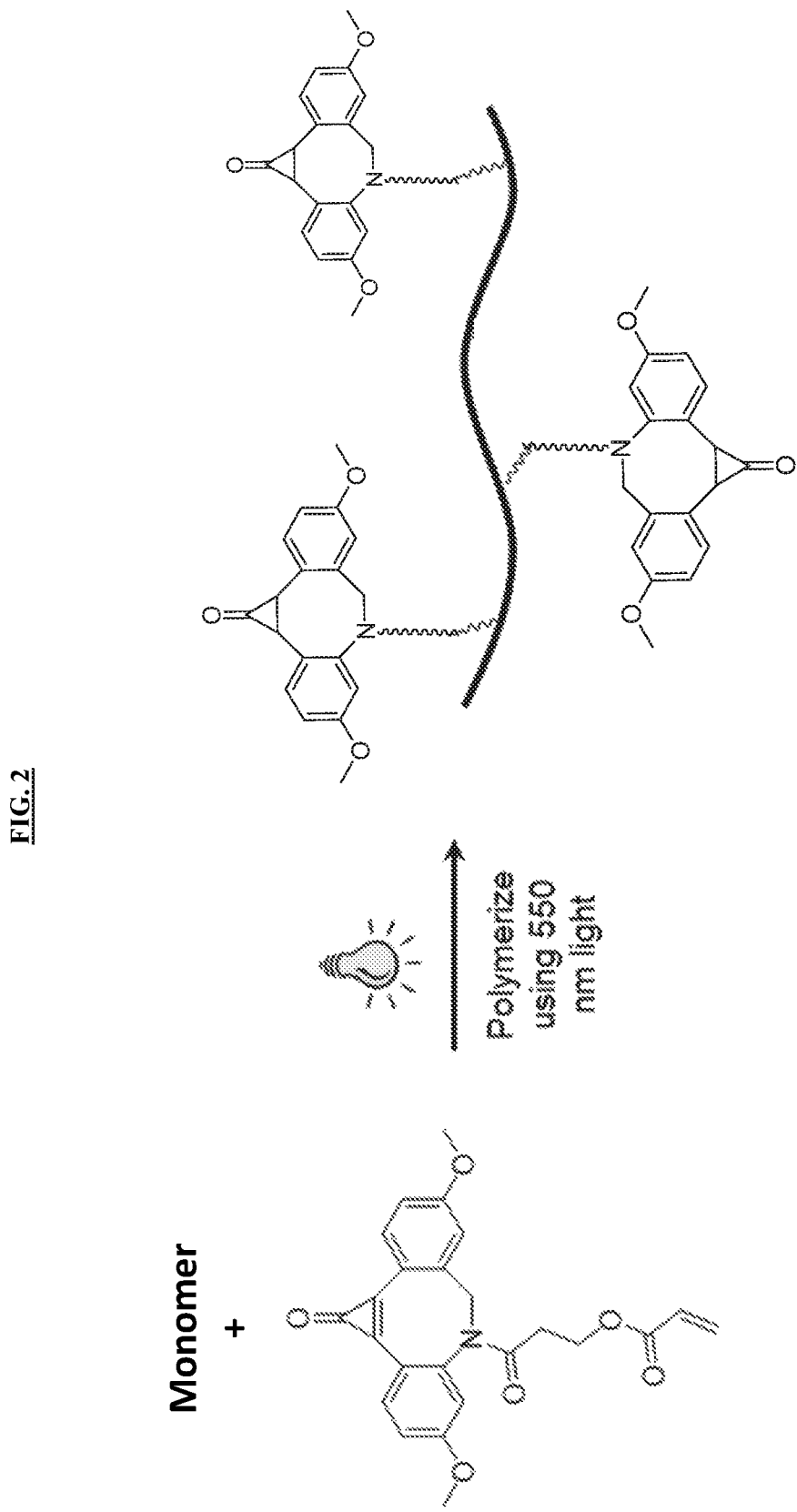
FIG. 2 illustrates an exemplary copolymerization with a masked DIBAC (cp-DIBAC).
Figure 3:
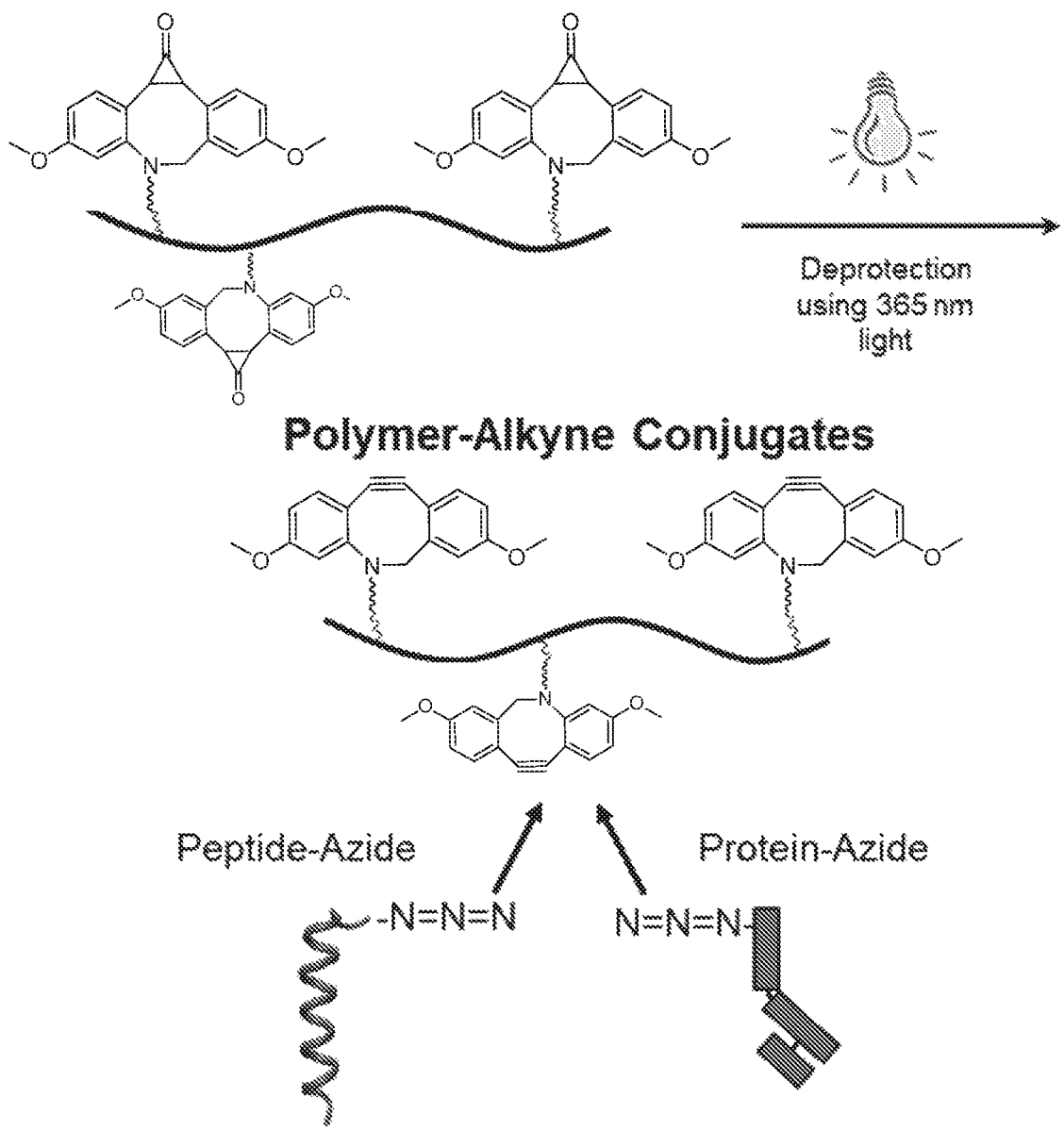
FIG. 3 illustrates an exemplary UV deprotection and SPAAC bioconjugation of polymers of the invention.
Figure 4A:
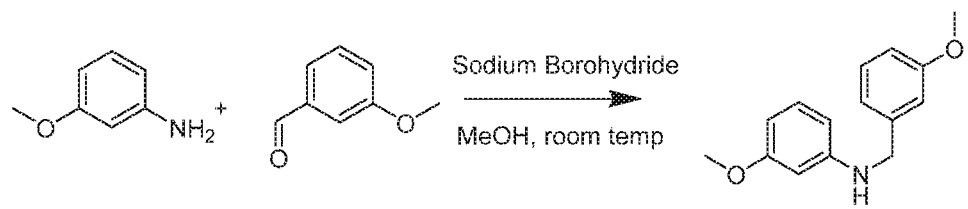
FIG. 4A-4B illustrate a non-limiting synthesis of an exemplary monomer of the invention.
Figure 4A:
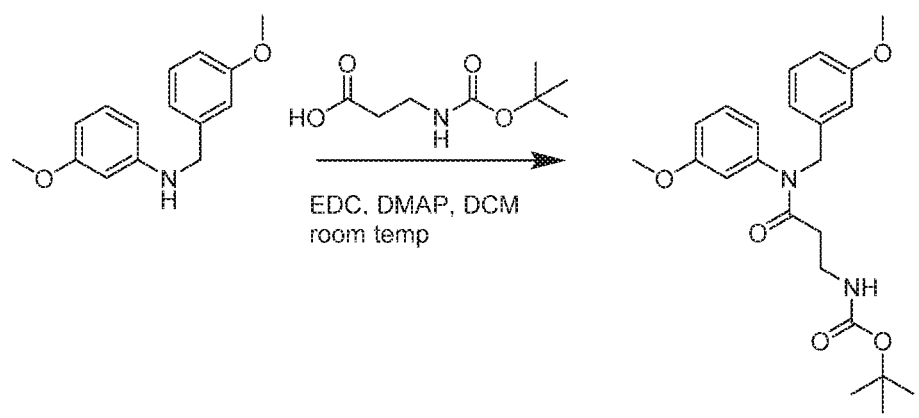
Figure 4A:
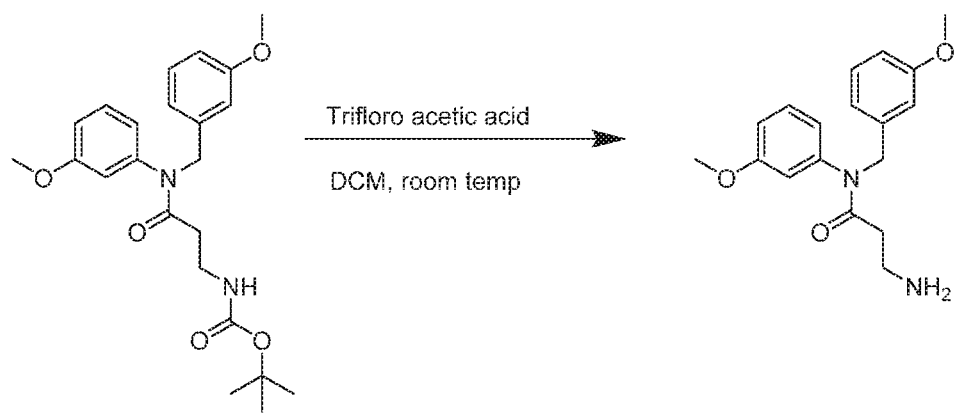
Figure 4B:
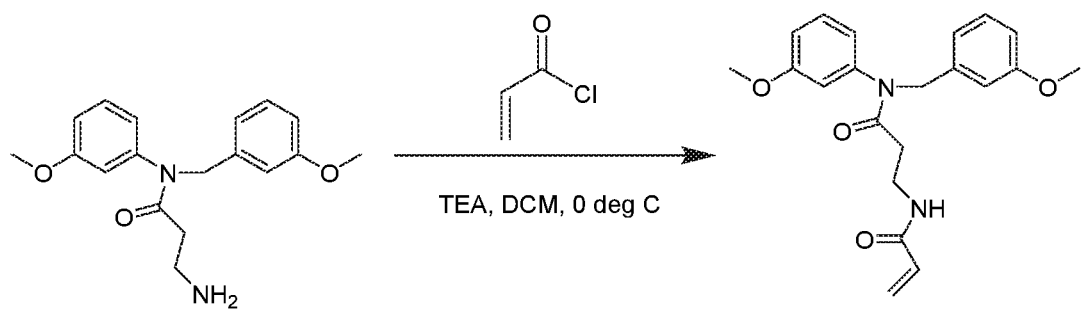
Figure 4B:
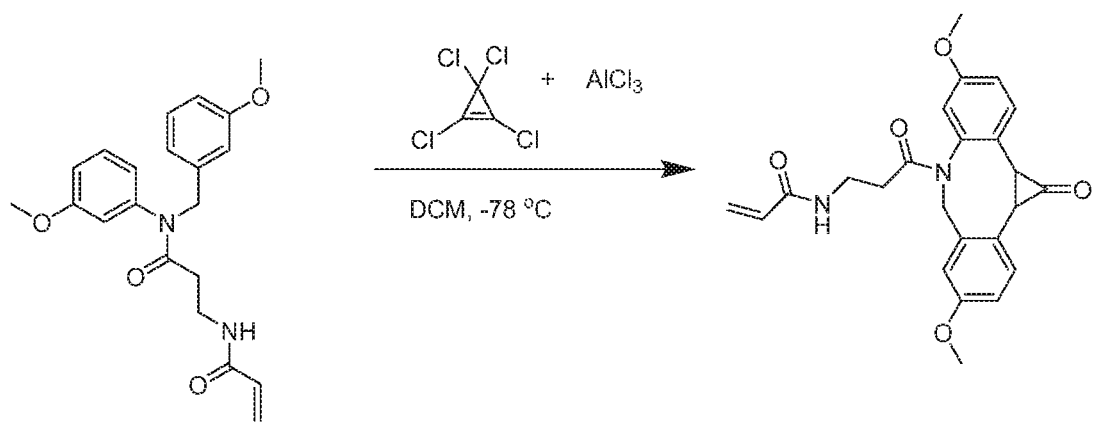
Figure 5:
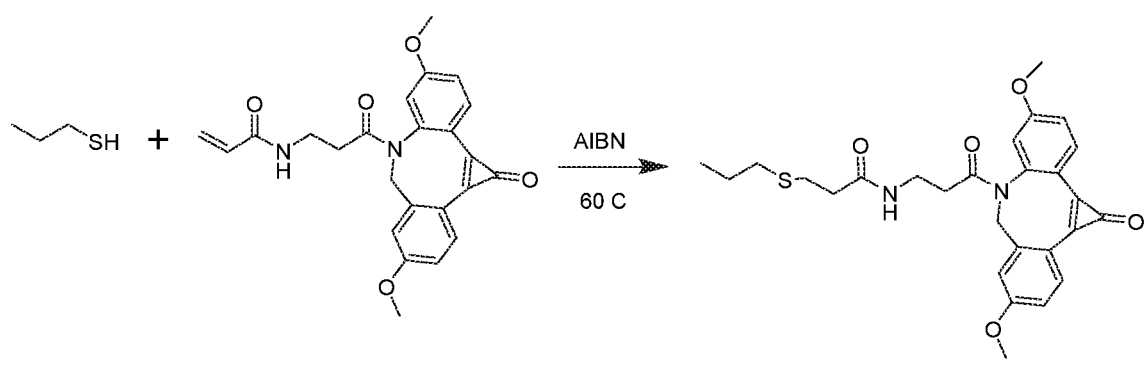
FIG. 5 illustrates conjugation of cp-DIBAC with a thiol (such as propanethiol).

The invention provides UV sensitive monomers, comprising a cyclopropenone group, which is radical-stable, acts as a masked dibenzoazacyclooctyne (DIBAC) or dibenzocyclooctyne (DBCO) group, and can be deprotected to a DIBAC or DBCO group through use of radiation. The monomers of the invention further comprise a polymerizable group, such as an α,β-unsaturated carbonyl or sulfonyl group, such as a (meth)acrylamide group.

As used herein, any description of a DIBAC group within the invention can be used interchangeably with a DBCO group, and any description of a DBCO group within the invention can be used interchangeably with a DIBAC group.

The monomers of the invention can be polymerized, in a non-limiting embodiment, using radical chemistry, for example, via reversible addition fragmentation chain transfer (RAFT) polymerization. The polymerized monomers afford a polymer comprising the masked DBCO/DIBAC group. In certain embodiments, the polymer of the invention further comprises unmasked DBCO/DIBAC groups as well; such unmasked DBCO/DIBAC groups can be introduced in the polymer through coupling reactions of DBCO/DIBAC-containing reagents and appropriate reactive groups on the polymer. These unmasked DBCO/DIBAC groups can be reacted with azido-containing molecules through highly selective and efficient strain-promoted azide alkyne click chemistry (SPAAC), thus allowing for the conjugation of small molecules and/or macromolecules to the polymer in the presence of the masked DIBAC groups.

In certain embodiments, the masked DIBAC groups in the polymer can be unmasked under controlled conditions and reacted with azido-containing molecules using SPAAC, allowing for conjugation of additional small molecules and/or macromolecules to the polymer.

In certain embodiments, the deprotected (unmasked) monomers and/or polymers of the invention can be reacted with azido-derivatized small molecules, therapeutic agents, and/or macromolecules (such as, but not limited to, antibiotics, antivirals, antifungals, polypeptides, proteins, antibodies, aptamers, saccharides, lipids, proteoglycans, chemotherapeutics, polymers, and so forth).

The monomers of the invention can also be conjugated with small molecules and/or macromolecules comprising reactive thiol groups (—SH), through a Michael addition of the thiol group into the α,β-unsaturated carbonyl or sulfonyl group. The monomers of the invention can also be conjugated with small molecules and/or macromolecules comprising reactive thiol groups (—SH) through thiol-ene free radical chemistry as appropriate.

In certain embodiments, the polymers of the invention can be conjugated with small molecules and/or macromolecules after the monomers are at least partially polymerized.

In certain embodiments, the monomers and/or polymers of the invention can be used for drug delivery. In certain embodiments, the monomers and/or polymers of the invention can be structurally modified so as to adjust the physical and/or chemical characteristics of the drug-containing compositions.

As described herein, an exemplary dibenzocyclooctyne monomer masked with a cyclopropenone group (cp-DIBAC) was prepared and directly copolymerized into a polymer backbone. Subsequent addition of the clickable azide with UV deprotection of the cyclopropenone results in rapid and efficient bioconjugation via SPAAC.

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The following abbreviations are used herein: ADIBO, azadibenzocyclooctyne; CRP, controlled radical polymerization; cp-DIBAC, cyclopropenone-masked dibenzoazacyclooctyne; CuAAC, copper(I)-catalyzed azide-alkyne cycloaddition; DBCO, dibenzocyclooctyne; DIBAC, dibenzoazacyclooctyne; DP, degree of polymerization; pDMA, polymerized dimethylacrylamide; PET-RAFT, porphyrin-catalyzed photoinduced electron/energy transfer-reversible addition-fragmentation chain-transfer; SPAAC, strain promoted azide-alkyne cycloaddition.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

As used herein, the term "abnormal" when used in the context of organisms, tissues, cells or components thereof, refers to those organisms, tissues, cells or components thereof that differ in at least one observable or detectable characteristic (e.g., age, treatment, or time of day) from those organisms, tissues, cells or components thereof that display the "normal" (expected) respective characteristic. Characteristics that are normal or expected for one cell or tissue type might be abnormal for a different cell or tissue type.

As used herein, the term "acrylate group" corresponds to the group —C(R')═C(R")—C(═O)—, wherein R' and R" are independently hydrogen, optionally substituted $C_1$-$C_6$ alkyl, aor optionally substituted $C_3$-$C_8$ cycloalkyl, which may be present in a monomer, an oligomer, and/or a polymer. In a non-limiting embodiment, the term "acrylate" encompass a methacrylate, wherein R" is methyl. In certain embodiments, the acrylate is part of an acrylamide, wherein the carbonyl of the acrylate is coupled to a primary or secondary amide. In certain embodiments, the acrylate can be acrylamide, methacrylamide, dimethyl acrylamide, methyl methacrylamide, benzyl methacrylamide (BnMA), isobutyl methacrylamide (BMA), and isododecyl methacrylamide (IDMA). In other embodiments, the acrylate is selected from the group consisting of ethylene glycoldi(meth)acrylate, ethoxylated bisphenol-A dimethacrylate (EBPADMA), tetraethyleneglycoldi(meth)acrylate (TEGDMA), poly(ethylene glycol) dimethacrylates, the condensation product of bisphenol A and glycidyl methacrylate, 2,2'-bis-[4-(3-methacryloxy-2-hydroxy propoxy)-phenyl] propane (BisGMA), hexanediol di(meth)acrylate, tripropylene glycol di(meth)acrylate, butanediol di(meth) acrylate, neopentyl glycol di(meth) acrylate, diethylene glycol di(meth) acrylate, triethylene glycol di(meth) acrylate, dipropylene glycol di(meth)acrylate, allyl (meth)acrylate, the corresponding amide, and any combinations thereof.

As used herein, the term "effective amount" or "therapeutically effective amount" of a compound is that amount of compound that is sufficient to provide a beneficial effect to the subject to which the compound is administered.

As used herein, the term "electromagnetic radiation" includes radiation of one or more frequencies encompassed within the electromagnetic spectrum. Non-limiting examples of electromagnetic radiation comprise gamma radiation, X-ray radiation, UV radiation, visible radiation, infrared radiation, microwave radiation, radio waves, and electron beam (e-beam) radiation. In one aspect, electromagnetic radiation comprises ultraviolet radiation (wavelength from about 10 nm to about 400 nm), visible radiation (wavelength from about 400 nm to about 750 nm) or infrared radiation (radiation wavelength from about 750 nm to about 300,000 nm). Ultraviolet or UV light as described herein includes UVA light, which generally has wavelengths between about 320 and about 400 nm, UVB light, which generally has wavelengths between about 290 nm and about 320 nm, and UVC light, which generally has wavelengths between about 200 nm and about 290 nm. UV light may include UVA, UVB, or UVC light alone or in combination with other type of UV light. In one embodiment, the UV light source emits light between about 350 nm and about 400 nm. In some embodiments, the UV light source emits light between about 400 nm and about 500 nm.

As used herein, an "instructional material" includes a publication, a recording, a diagram, or any other medium of expression that can be used to communicate the usefulness of a composition or method of the invention in the kit for performing the methods recited herein. Optionally, or alternately, the instructional material can describe one or more methods recited herein. The instructional material of the kit of the invention can, for example, be affixed to a container that contains the identified composition or delivery system of the invention or be shipped together with a container that contains the identified composition or delivery system. Alternatively, the instructional material can be shipped separately from the container with the intention that the instructional material and the composition be used cooperatively by the recipient.

As used herein, the term "polymer" refers to a molecule composed of repeating structural units typically connected by covalent chemical bonds. The term "polymer" is also meant to include the terms copolymer and oligomers. In one embodiment, a polymer comprises a backbone (i.e., the chemical connectivity that defines the central chain of the polymer, including chemical linkages among the various polymerized monomeric units) and a side chain (i.e., the chemical connectivity that extends away from the backbone).

As used herein, the term "polymerization" or "crosslinking" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combinations thereof. A polymerization or crosslinking reaction may consume between about 0% and about 100% of the at least one functional group available in the system. In one embodiment, polymerization or crosslinking of at least one functional group results in about 100% consumption of the at least one functional group. In other embodiments, polymerization or crosslinking of at least one functional group results in less than about 100% consumption of the at least one functional group.

As used herein, reversible addition-fragmentation chain transfer or "RAFT" polymerization is a type of reversible-deactivation radical polymerization. It uses a chain transfer agent in the form of a RAFT agent, such as a thiocarbonylthio compound (such as dithioesters, thiocarbamates, and xanthates), to afford control over the generated molecular weight and polydispersity during a free-radical polymerization. RAFT polymerization is a living or controlled radical polymerization techniques, others examples being atom transfer radical polymerization (ATRP) and nitroxide-mediated polymerization (NMP). RAFT polymerizations can be performed with conditions to favor low dispersity (molecular weight distribution) and a pre-chosen molecular weight.

As used herein, the term "reaction condition" refers to a physical treatment, chemical reagent, or combination thereof, which is required or optionally required to promote a reaction. Non-limiting examples of reaction conditions are electromagnetic radiation, heat, a catalyst, a chemical reagent (such as, but not limited to, an acid, base, electrophile or nucleophile), and a buffer.

As used herein, the term "alkenyl," employed alone or in combination with other terms, means, unless otherwise stated, a stable monounsaturated or diunsaturated straight chain or branched chain hydrocarbon group having the stated number of carbon atoms. Examples include vinyl, propenyl (or allyl), crotyl, isopentenyl, butadienyl, 1,3-pentadienyl, 1,4-pentadienyl, and the higher homologs and isomers. A functional group representing an alkene is exemplified by —$CH_2$—CH=$CH_2$.

As used herein, the term "alkoxy" employed alone or in combination with other terms means, unless otherwise stated, an alkyl group having the designated number of carbon atoms, as defined elsewhere herein, connected to the rest of the molecule via an oxygen atom, such as, for example, methoxy, ethoxy, 1-propoxy, 2-propoxy (or isopropoxy), and the higher homologs and isomers. A specific example is ($C_1$-$C_3$)alkoxy, such as, but not limited to, ethoxy and methoxy.

As used herein, the term "alkyl," by itself or as part of another substituent means, unless otherwise stated, a straight or branched chain hydrocarbon having the number of carbon atoms designated (i.e., $C_1$-$C_{10}$ means one to ten carbon atoms) and includes straight, branched chain, or cyclic substituent groups. Examples include methyl, ethyl, propyl, isopropyl, butyl, isobutyl, tert-butyl, pentyl, neopentyl, hexyl, and cyclopropylmethyl. Most preferred is ($C_1$-$C_6$) alkyl, such as, but not limited to, ethyl, methyl, isopropyl, isobutyl, n-pentyl, n-hexyl and cyclopropylmethyl.

As used herein, the term "alkynyl" employed alone or in combination with other terms means, unless otherwise stated, a stable straight chain or branched chain hydrocarbon group with a triple carbon-carbon bond, having the stated number of carbon atoms. Non-limiting examples include ethynyl and propynyl, and the higher homologs and isomers. The term "propargylic" refers to a group exemplified by —$CH_2$—C≡CH. The term "homopropargylic" refers to a group exemplified by —$CH_2CH_2$—C≡CH.

As used herein, the term "aromatic" refers to a carbocycle or heterocycle with one or more polyunsaturated rings and having aromatic character, i.e., having (4n+2) delocalized π (pi) electrons, where 'n' is an integer.

As used herein, the term "aryl" employed alone or in combination with other terms means, unless otherwise stated, a carbocyclic aromatic system containing one or more rings (typically one, two or three rings) wherein such rings may be attached together in a pendent manner, such as a biphenyl, or may be fused, such as naphthalene. Examples include phenyl, anthracyl, and naphthyl. Aryl groups also include, for example, phenyl or naphthyl rings fused with one or more saturated or partially saturated carbon rings (e.g., bicyclo[4.2.0]octa-1,3,5-trienyl, or indanyl), which can be substituted at one or more carbon atoms of the aromatic and/or saturated or partially saturated rings.

As used herein, the term "aryl-($C_1$-$C_6$)alkyl" refers to a functional group wherein a one to six carbon alkanediyl chain is attached to an aryl group, e.g., —$CH_2CH_2$-phenyl or —$CH_2$-phenyl (or benzyl). Specific examples are aryl-$CH_2$— and aryl-CH($CH_3$)—. The term "substituted aryl-($C_1$-$C_6$)alkyl" refers to an aryl-($C_1$-$C_6$)alkyl functional group in which the aryl group is substituted. A specific example is [substituted aryl]—($CH_2$)—. Similarly, the term "heteroaryl-($C_1$-$C_6$)alkyl" refers to a functional group wherein a one to three carbon alkanediyl chain is attached to a heteroaryl group, e.g., —$CH_2CH_2$-pyridyl. A specific example is heteroaryl-($CH_2$)—. The term "substituted heteroaryl-($C_1$-$C_6$)alkyl" refers to a heteroaryl-($C_1$-$C_6$)alkyl functional group in which the heteroaryl group is substituted. A specific example is [substituted heteroaryl]—($CH_2$)—.

As used herein, the term "cycloalkyl" by itself or as part of another substituent refers to, unless otherwise stated, a cyclic chain hydrocarbon having the number of carbon atoms designated (i.e., $C_3$-$C_6$ refers to a cyclic group comprising a ring group consisting of three to six carbon atoms) and includes straight, branched chain, or cyclic substituent groups. Examples of ($C_3$-$C_6$)cycloalkyl groups are cyclopropyl, cyclobutyl, cyclopentyl, and cyclohexyl. Cycloalkyl rings can be optionally substituted. Non-limiting examples of cycloalkyl groups include: cyclopropyl, 2-methyl-cyclopropyl, cyclopropenyl, cyclobutyl, 2,3-dihydroxycyclobutyl, cyclobutenyl, cyclopentyl, cyclopentenyl, cyclopentadienyl, cyclohexyl, cyclohexenyl, cycloheptyl, cyclooctanyl, decalinyl, 2,5-dimethylcyclopentyl, 3,5-dichlorocyclohexyl, 4-hydroxycyclohexyl, 3,3,5-trimethylcyclohex-1-yl, octahydropentalenyl, octahydro-1H-indenyl, 3a,4,5,6,7,7a-hexahydro-3H-inden-4-yl, decahydroazulenyl; bicyclo[6.2.0]decanyl, decahydronaphthalenyl, and dodecahydro-1H-fluorenyl. The term "cycloalkyl" also includes bicyclic hydrocarbon rings, non-limiting examples of which include bicyclo-[2.1.1]hexanyl, bicyclo[2.2.1]heptanyl, bicyclo[3.1.1]heptanyl, 1,3-dimethyl[2.2.1] heptan-2-yl, bicyclo[2.2.2]octanyl, and bicyclo[3.3.3]undecanyl.

As used herein, the term "halide" refers to a halogen atom bearing a negative charge. The halide anions are fluoride ($F^-$), chloride ($Cl^-$), bromide ($Br^-$), and iodide ($I^-$).

As used herein, the term "halo" or "halogen" alone or as part of another substituent refers to, unless otherwise stated, a fluorine, chlorine, bromine, or iodine atom.

As used herein, the term "heteroalkyl" by itself or in combination with another term refers to, unless otherwise stated, a stable straight or branched chain alkyl group consisting of the stated number of carbon atoms and one or two heteroatoms selected from the group consisting of O, N, and S, and wherein the nitrogen and sulfur atoms may be optionally oxidized and the nitrogen heteroatom may be optionally quaternized. The heteroatom(s) may be placed at any position of the heteroalkyl group, including between the rest of the heteroalkyl group and the fragment to which it is attached, as well as attached to the most distal carbon atom in the heteroalkyl group. Examples include: —$OCH_2CH_2CH_3$, —$CH_2CH_2CH_2OH$, —$CH_2CH_2NHCH_3$, —$CH_2SCH_2CH_3$, and —$CH_2CH_2S(=O)CH_3$. Up to two heteroatoms may be consecutive, such as, for example, —$CH_2NH$—$OCH_3$, or —$CH_2CH_2SSCH_3$.

As used herein, the term "heteroaryl" or "heteroaromatic" refers to a heterocycle having aromatic character. A polycyclic heteroaryl may include one or more rings that are partially saturated. Examples include tetrahydroquinoline and 2,3-dihydrobenzofuryl.

As used herein, the term "heterocycle" or "heterocyclyl" or "heterocyclic" by itself or as part of another substituent refers to, unless otherwise stated, an unsubstituted or substituted, stable, mono- or multi-cyclic heterocyclic ring system that comprises carbon atoms and at least one heteroatom selected from the group consisting of N, O, and S, and wherein the nitrogen and sulfur heteroatoms may be optionally oxidized, and the nitrogen atom may be optionally quaternized. The heterocyclic system may be attached, unless otherwise stated, at any heteroatom or carbon atom that affords a stable structure. A heterocycle may be aromatic or non-aromatic in nature. In certain embodiments, the heterocycle is a heteroaryl.

Examples of non-aromatic heterocycles include monocyclic groups such as aziridine, oxirane, thiirane, azetidine, oxetane, thietane, pyrrolidine, pyrroline, imidazoline, pyrazolidine, dioxolane, sulfolane, 2,3-dihydrofuran, 2,5-dihydrofuran, tetrahydrofuran, thiophane, piperidine, 1,2,3,6-tetrahydropyridine, 1,4-dihydropyridine, piperazine, morpholine, thiomorpholine, pyran, 2,3-dihydropyran, tetrahydropyran, 1,4-dioxane, 1,3-dioxane, homopiperazine, homopiperidine, 1,3-dioxepane, 4,7-dihydro-1,3-dioxepin and hexamethyleneoxide.

Examples of heteroaryl groups include pyridyl, pyrazinyl, pyrimidinyl (such as, but not limited to, 2- and 4-pyrimidinyl), pyridazinyl, thienyl, furyl, pyrrolyl, imidazolyl, thiazolyl, oxazolyl, pyrazolyl, isothiazolyl, 1,2,3-triazolyl, 1,2,4-triazolyl, 1,3,4-triazolyl, tetrazolyl, 1,2,3-thiadiazolyl, 1,2,3-oxadiazolyl, 1,3,4-thiadiazolyl and 1,3,4-oxadiazolyl.

Examples of polycyclic heterocycles include indolyl (such as, but not limited to, 3-, 4-, 5-, 6- and 7-indolyl), indolinyl, quinolyl, tetrahydroquinolyl, isoquinolyl (such as, but not limited to, 1- and 5-isoquinolyl), 1,2,3,4-tetrahydroisoquinolyl, cinnolinyl, quinoxalinyl (such as, but not limited to, 2- and 5-quinoxalinyl), quinazolinyl, phthalazinyl, 1,8-naphthyridinyl, 1,4-benzodioxanyl, coumarin, dihydrocoumarin, 1,5-naphthyridinyl, benzofuryl (such as, but not limited to, 3-, 4-, 5-, 6- and 7-benzofuryl), 2,3-dihydrobenzofuryl, 1,2-benzisoxazolyl, benzothienyl (such as, but not limited to, 3-, 4-, 5-, 6-, and 7-benzothienyl), benzoxazolyl, benzothiazolyl (such as, but not limited to, 2-benzothiazolyl and 5-benzothiazolyl), purinyl, benzimidazolyl, benztriazolyl, thioxanthinyl, carbazolyl, carbolinyl, acridinyl, pyrrolizidinyl, and quinolizidinyl.

The aforementioned listing of heterocyclyl and heteroaryl moieties is intended to be representative and not limiting.

As used herein, the term "substituted" refers to that an atom or group of atoms has replaced hydrogen as the substituent attached to another group.

As used herein, the term "substituted alkyl," "substituted cycloalkyl," "substituted alkenyl" or "substituted alkynyl" refers to alkyl, cycloalkyl, alkenyl, or alkynyl, as defined elsewhere herein, substituted by one, two or three substituents independently selected from the group consisting of halogen, —OH, alkoxy, tetrahydro-2-H-pyranyl, —$NH_2$, —NH($C_1$-$C_6$ alkyl), —N($C_1$-$C_6$ alkyl)$_2$, 1-methyl-imidazol-2-yl, pyridin-2-yl, pyridin-3-yl, pyridin-4-yl, —C(=O)OH, —C(=O)O($C_1$-$C_6$)alkyl, trifluoromethyl, —C≡N, —C(=O)$NH_2$, —C(=O)NH($C_1$-$C_6$)alkyl, —C(=O)N(($C_1$-$C_6$)alkyl)$_2$, —$SO_2NH_2$, —$SO_2$NH($C_1$-$C_6$ alkyl), —$SO_2$N($C_1$-$C_6$ alkyl)$_2$, —C(=NH)$NH_2$, and —$NO_2$, in certain embodiments containing one or two substituents independently selected from halogen, —OH, alkoxy, —$NH_2$, trifluoromethyl, —N($CH_3$)$_2$, and —C(=O)OH, in certain embodiments independently selected from halogen, alkoxy, and —OH. Examples of substituted alkyls include, but are not limited to, 2,2-difluoropropyl, 2-carboxycyclopentyl and 3-chloropropyl.

For aryl, aryl-($C_1$-$C_3$)alkyl and heterocyclyl groups, the term "substituted" as applied to the rings of these groups refers to any level of substitution, namely mono-, di-, tri-, tetra-, or penta-substitution, where such substitution is permitted. The substituents are independently selected, and substitution may be at any chemically accessible position. In certain embodiments, the substituents vary in number between one and four. In other embodiments, the substituents vary in number between one and three. In yet another embodiments, the substituents vary in number between one and two. In yet other embodiments, the substituents are independently selected from the group consisting of $C_1$-$C_6$ alkyl, —OH, $C_1$-$C_6$ alkoxy, halo, amino, acetamido, and nitro. As used herein, where a substituent is an alkyl or alkoxy group, the carbon chain may be branched, straight or cyclic.

Unless otherwise noted, when two substituents are taken together to form a ring having a specified number of ring atoms (e.g., two groups taken together with the nitrogen to which they are attached to form a ring having from 3 to 7 ring members), the ring can have carbon atoms and optionally one or more (e.g., 1 to 3) additional heteroatoms independently selected from nitrogen, oxygen, or sulfur. The ring can be saturated or partially saturated, and can be optionally substituted.

Whenever a term or either of their prefix roots appear in a name of a substituent the name is to be interpreted as including those limitations provided herein. For example, whenever the term "alkyl" or "aryl" or either of their prefix roots appear in a name of a substituent (e.g., arylalkyl, alkylamino) the name is to be interpreted as including those limitations given elsewhere herein for "alkyl" and "aryl" respectively.

In certain embodiments, substituents of compounds are disclosed in groups or in ranges. It is specifically intended that the description include each and every individual subcombination of the members of such groups and ranges. For example, the term "$C_{1-6}$ alkyl" is specifically intended to individually disclose $C_1$, $C_2$, $C_3$, $C_4$, $C_5$, $C_6$, $C_1$-$C_6$, $C_1$-$C_5$, $C_1$-$C_4$, $C_1$-$C_3$, $C_1$-$C_2$, $C_2$-$C_6$, $C_2$-$C_5$, $C_2$-$C_4$, $C_2$-$C_3$, $C_3$-$C_6$, $C_3$-$C_5$, $C_3$-$C_4$, $C_4$-$C_6$, $C_4$-$C_5$, and $C_5$-$C_6$ alkyl.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 and the like, as well as individual numbers within that range, for example, 1, 2, 2.7, 3, 4, 5, 5.3, and 6. This applies regardless of the breadth of the range.

DESCRIPTION

The invention provides a compound comprising an α,β-unsaturated carboxamide [—C(R')=C(R")—C(=O)NH—] group or α,β-unsaturated sulfonamide [—C(R')=C(R")—S(=O)$_2$NH—] group conjugated to a group of formula (I):

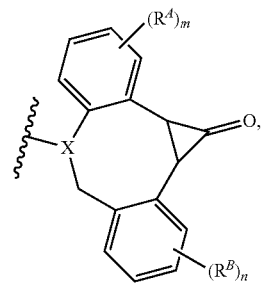

wherein:
each occurrence of R' and R" is independently hydrogen, optionally substituted $C_1$-$C_6$ alkyl, or optionally substituted $C_3$-$C_8$ cycloalkyl;
X is N or CH;
each occurrence of $R^A$ is independently H, F, Cl, Br, I, —CN, —$NO_2$, —$OR^C$, —$SR^C$, —S(=O)$_{1-2}R^C$, —N($R^C$)$_2$, —$NR^C$C(=O)$R^C$, —C(=O)N($R^C$)$_2$, —$NR^C$C(=O)N($R^C$)$_2$, —S(=O)$_2$N($R^C$)$_2$, —C(=O)$R^C$, —C(=O)$OR^C$, $C_1$-$C_6$ alkyl, $C_1$-$C_6$ haloalkyl, $C_1$-$C_6$ alkoxy, $C_1$-$C_6$ haloalkoxy, $C_3$-$C_8$ cycloalkyl, phenyl, heterocyclyl, and heteroaryl,
  wherein each occurrence of $R^C$ is independently selected from the group consisting of hydrogen, —$OR^C$, —$SR^C$, —C(=O)$R^C$, —C(=O)$OR^C$, —C(=O)N($R^C$)$_2$, —S(=O)$_{1-2}R^C$, —N($R^C$)$_2$, —$NR^C$C(=O)$R^C$, $C_{1-6}$ alkyl, $C_{1-6}$ haloalkyl, $C_{3-6}$ cycloalkyl, and phenyl, or two $R^C$ units taken together with the atom(s) to which they are bound form a 3-7 membered ring, wherein the alkyl, haloalkyl, alkenyl, alkynyl, cycloalkyl, or phenyl is independently optionally substituted with at least one substituent independently selected from —$OR^E$; —C(=O)$R^E$; —C(=O)$OR^E$; —C(=O)N($R^E$)$_2$; N($R^E$)$_2$; halogen; —$CH_eX_g$, wherein X is independently halogen, e is 0, 1, or 2, and e+g=3; —S(=O)$_2R^E$; $C_1$-$C_6$ alkyl; —CN; —N($R^E$)C(=O)$R^E$; oxo (=O); heterocyclyl; and heteroaryl;
  wherein each $R^E$ is independently selected from the group consisting of hydrogen, optionally substituted $C_1$-$C_6$ alkyl, and optionally substituted $C_3$-$C_8$ cycloalkyl; or two $R^E$ units can be taken together to form a ring comprising 3-7 ring atoms;

each occurrence of $R^B$ is independently H, F, Cl, Br, I, —CN, —NO$_2$, —OR$^D$, —SR$^D$, —S(═O)$_{1-2}$R$^D$, —N(R$^D$)$_2$, —NR$^D$C(═O)R$^D$, —C(═O)N(R$^D$)$_2$, —NR$^D$C(═O)N(R$^D$)$_2$, —S(═O)$_2$N(R$^D$)$_2$, —C(═O)R$^D$, —C(═O)OR$^D$, $C_1$-$C_6$ alkyl, $C_1$-$C_6$ haloalkyl, $C_1$-$C_6$ alkoxy, $C_1$-$C_6$ haloalkoxy, $C_3$-$C_8$ cycloalkyl, phenyl, heterocyclyl, and heteroaryl, wherein each occurrence of $R^D$ is independently selected from the group consisting of hydrogen, —OR$^F$, —SR$^F$, —C(═O)R$^F$, —C(═O)OR$^F$, —C(═O)N(R$^F$)$_2$, —S(═O)$_{1-2}$R$^F$, —N(R$^F$)$_2$, —NR$^F$C(═O)R$^F$, $C_{1-6}$ alkyl, $C_{1-6}$ haloalkyl, $C_{3-6}$ cycloalkyl, and phenyl, or two $R^F$ units taken together with the atom(s) to which they are bound form a 3-7 membered ring, wherein the alkyl, haloalkyl, alkenyl, alkynyl, cycloalkyl, or phenyl is independently optionally substituted with at least one substituent independently selected from —OR$^F$; —C(═O)R$^F$; —C(═O)OR$^F$; —C(═O)N(R$^F$)$_2$; N(R$^F$)$_2$; halogen; —CH$_e$X$_g$, wherein X is independently halogen, e is 0, 1, or 2, and e+g=3; —S(═O)$_2$R$^F$; $C_1$-$C_6$ alkyl; —CN; —N(R$^F$)C(═O)R$^F$; oxo (═O); heterocyclyl; and heteroaryl;

wherein each $R^F$ is independently selected from the group consisting of hydrogen, optionally substituted $C_1$-$C_6$ alkyl, and optionally substituted $C_3$-$C_8$ cycloalkyl; or two $R^F$ units can be taken together to form a ring comprising 3-7 ring atoms;

m is 0, 1, 2, 3, or 4;
n is 0, 1, 2, 3, or 4.

In certain embodiments, X is N.
In certain embodiments, X is CH.
In certain embodiments, at least one $R^A$ is —OR$^C$. In certain embodiments, the $R^A$ is para to the carbon to which the cyclopropenone group is bound. In certain embodiments, at least one $R^A$ is —OR$^C$ and is para to the carbon to which the cyclopropenone group is bound.

In certain embodiments, at least one $R^B$ is —OR$^D$. In certain embodiments, the $R^B$ is para to the carbon to which the cyclopropenone group is bound. In certain embodiments, at least one $R^B$ is —OR$^D$ and para to the carbon to which the cyclopropenone group is bound.

In certain embodiments, m is 0. In certain embodiments, m is 1. In certain embodiments, m is 2. In certain embodiments, m is 3. In certain embodiments, m is 4.

In certain embodiments, n is 0. In certain embodiments, n is 1. In certain embodiments, n is 2. In certain embodiments, n is 3. In certain embodiments, n is 4.

In certain embodiments, (I) is:

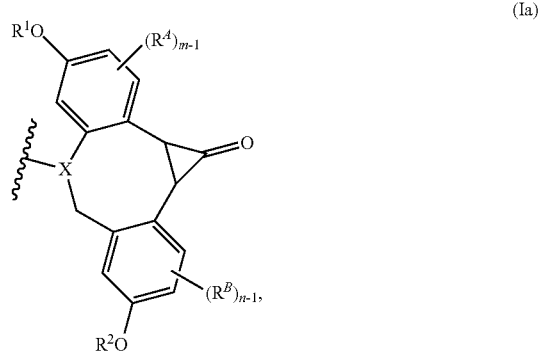

(Ia)

wherein $R^1$ and $R^2$ are independently selected from the group consisting of H, optionally substituted $C_1$-$C_6$ alkyl, and optionally substituted $C_3$-$C_8$ cycloalkyl, m is 1, 2, 3, or 4, and n is 1, 2, 3, or 4.

In certain embodiments, (I) is:

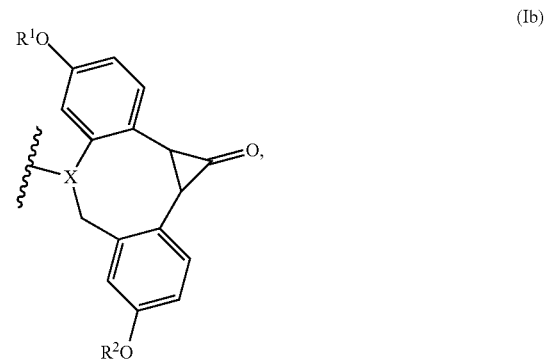

(Ib)

wherein $R^1$ and $R^2$ are independently selected from the group consisting of H, optionally substituted $C_1$-$C_6$ alkyl, and optionally substituted $C_3$-$C_8$ cycloalkyl.

In certain embodiments, $R^1$ and $R^2$ are independently selected from the group consisting of $C_1$-$C_6$ alkyl and $C_3$-$C_8$ cycloalkyl. In certain embodiments, $R^1$ and $R^2$ are both methyl.

In certain embodiments, the α,β-unsaturated carboxamide comprises C(R')$_2$═C(R'')—C(═O)NH—.

In certain embodiments, the α,β-unsaturated sulfonamide comprises C(R')$_2$═C(R'')—S(═O)$_2$NH—.

In certain embodiments, (I) is conjugated by a linker to the amide nitrogen of the α,β-unsaturated carboxamide or sulfonamide group.

In certain embodiments, the linker comprises the formula:

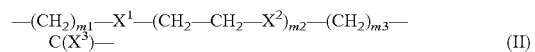

(II)

wherein:
the amide nitrogen of the α,β-unsaturated carboxamide or sulfonamide group is covalently bonded to —(CH$_2$)$_{m1}$, and (I) is covalently bonded to C(X$^3$)—;
each m1, m2, and m3 is independently 0, 1, 2, 3, 4, 5, 6, 7, 8, 9, or 10;
each X$^1$, X$^2$, and X$^3$ is independently absent (a bond), O, or N—R$^3$.
each R$^3$ is independently selected from the group consisting of hydrogen, optionally substituted $C_1$-$C_6$ alkyl, optionally substituted $C_3$-$C_8$ cycloalkyl, and optionally substituted $C_3$-$C_8$ cycloheteroalkyl.

In certain embodiments, the linker comprises the formula:

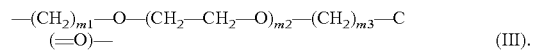

(III).

In certain embodiments, the linker comprises the formula:

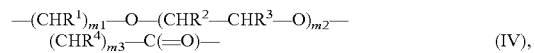

(IV), wherein:
the amide nitrogen of the α,β-unsaturated carboxamide or sulfonamide group is covalently bonded to —(CHR$^1$)$_{m1}$, and (I) is covalently bonded to C(O)—;
each m1, m2, and m3 is independently 0, 1, 2, 3, 4, 5, 6, 7, 8, 9, or 10;
each R$^1$, R$^2$, R$^3$, and R$^4$ is independently selected from the group consisting of hydrogen, optionally substituted C$_1$-C$_6$ alkyl, optionally substituted C$_3$-C$_8$ cycloalkyl, and optionally substituted C$_3$-C$_8$ cycloheteroalkyl.

In certain embodiments, the linker comprises a polyethylene glycol chain ranging in size from about 1 to about 12 ethylene glycol units.

In certain embodiments, the linker comprises 1-20 optionally substituted methylene groups.

In certain embodiments, the compound is:

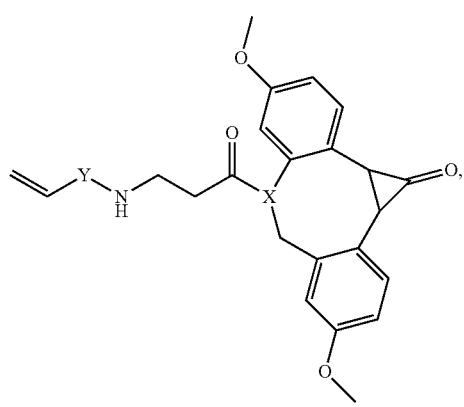

(V)

wherein Y is C(=O) or S(=O)$_2$. In certain embodiments, the compound is a monomer.

The invention further provides a polymer comprising the at least partially polymerized compound of the invention. In certain embodiments, the polymer is a hydrogel. In certain embodiments, the at least partially polymerized compound is not cross-linked therein, and thus the polymer is linear. In certain embodiments, the at least partially polymerized compound is at least partially cross-linked. In certain embodiments, the at least partially polymerized compound is at least partially cross-linked by a bis-acrylate cross-linking agent. In certain embodiments, the bis-acrylate cross-linking agent is selected from the group consisting of ethylene glycol dimethacrylate, tetraethyleneglycol-dimethacrylate, poly(ethylene glycol) dimethacrylates, the condensation product of bisphenol A and glycidyl methacrylate, 2,2'-bis [4-(3-methacryloxy-2-hydroxypropoxy)-phenyl] propane, hexanediol dimethacrylate, tripropylene glycol dimethacrylate, butanediol dimethacrylate, neopentyl glycol dimethacrylate, diethylene glycol dimethacrylate, triethylene glycol dimethacrylate, dipropylene glycol dimethacrylate, allyl methacrylate trimethylolpropane triacrylate, tricyclodecane dimethanol diacrylate, and any combinations thereof.

In certain embodiments, the polymer of the invention further comprises at least one group comprising:

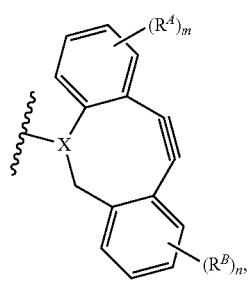

(VI)

wherein X, R$^A$, m, R$^B$, and n in (VI) are the same as in (I), but independently selected therefrom. (VI) can be introduced in the polymer by reacting a DBCO/DIBAC reagent with a reactive group in the polymer, whereby (VI) becomes covalently attached to the polymer. In non-limiting example, a DBCO/DIBAC reagent comprising (VI) linked through a linker to a primary or secondary amino group can be reacted with a free carboxylic group on the polymer using an amide coupling agent (such as but not limited to DCC, DIC, EDC, BOP, COMU, HATU, HBTU, HCTU, PyAOP, PyBOP, PyBrOP, PyClock, PyOxim, TOTU, and so forth) whereby (VI) becomes incorporated in the polymer. In non-limiting example, a DBCO/DIBAC reagent comprising (VI) linked through a linker to a primary or secondary amino group can be reacted with an activated carboxylic group on the polymer (such as but not limited to a N-hydroxysuccinamide ester) whereby (VI) becomes incorporated in the polymer. In non-limiting example, a DBCO/DIBAC reagent comprising (VI) linked through a linker to a carboxylic acid can be reacted with a free primary or secondary amino group on the polymer using an amide coupling agent (such as but not limited to DCC, DIC, EDC, BOP, COMU, HATU, HBTU, HCTU, PyAOP, PyBOP, PyBrOP, PyClock, PyOxim, TOTU, and so forth) whereby (VI) becomes incorporated in the polymer. In non-limiting example, a DBCO/DIBAC reagent comprising (VI) linked through a linker to an activated carboxylic acid (such as but not limited to a N-hydroxysuccinamide ester) can be reacted with a primary or secondary amino group on the polymer whereby (VI) becomes incorporated in the polymer. Methods of coupling (VI) to the polymer are known in the art and are incorporated herein by reference.

In certain embodiments, at least a fraction of the partially polymerized compound is converted to

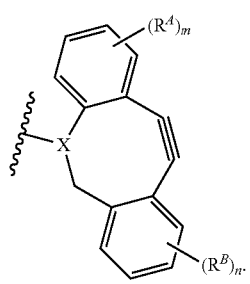

(VII)

In certain embodiments, at least a fraction of the partially polymerized compound is converted to:

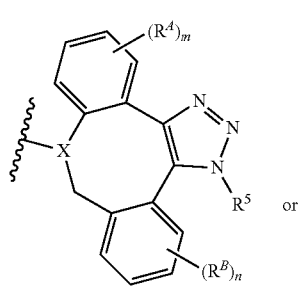

(VIII)

or

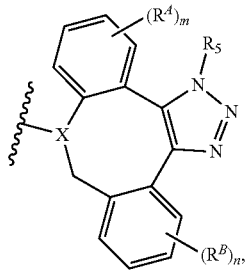

(IX)

wherein $R^5$ is a small molecule, therapeutic agent, or macromolecule.

The invention further provides a method of derivatizing at least a portion of a polymer of the invention with a small molecule or a macromolecule.

In certain embodiments, the polymer comprises at least one group (I). In certain embodiments, the method comprises irradiating the polymer to convert at least one cyclopropenone group (I) to the corresponding cycloalkyne group, and contacting the resulting material with an azido-containing small molecule or macromolecule. In certain embodiments, the radiation used is around 365 nm.

In certain embodiments, the polymer comprises at least one group (I) and at least one group (VI). In certain embodiments, the method comprises contacting the polymer with an azido-containing small molecule, therapeutic agent, or macromolecule, under conditions that allow for reaction between the azido-containing small molecule, therapeutic agent, or macromolecule with (VI). In certain embodiments, the method further comprises irradiating the polymer to convert at least one cyclopropenone group (I) to the corresponding cycloalkyne group (VII). In certain embodiments, the method further comprises contacting the resulting material with an independently selected azido-containing small molecule, therapeutic agent, or macromolecule under conditions that allow for reaction between the azido-containing small molecule, therapeutic agent, or macromolecule with (VII). In certain embodiments, the radiation used is around 365 nm.

In certain embodiments, the derivatized polymer does not release significant amounts of the small molecule or a macromolecule when contacted with a cell or tissue in vitro or in vivo.

The invention further provides a method of contacting a small molecule, therapeutic agent, and/or macromolecule with a cell, tissue, and/or subject. In certain embodiments, the method comprises contacting the cell, tissue, and/or subject with a polymer comprising (VIII) or (IX).

In certain embodiments, the group (VIII) or (IX) is derived from a monomer comprising (I).

In certain embodiments, the irradiation comprises ultraviolet electromagnetic radiation (wavelength about 10-400 nm), visible electromagnetic radiation (wavelength about 400-750 nm) or infrared electromagnetic radiation (radiation wavelength about 750-300,000 nm). In other embodiments, the electromagnetic radiation comprises ultraviolet or visible electromagnetic radiation.

Ultraviolet or UV light as described herein includes UVA light, which generally has wavelengths between about 320 and about 400 nm, UVB light, which generally has wavelengths between about 290 nm and about 320 nm, and UVC light, which generally has wavelengths between about 200 nm and about 290 nm. UV light may include UVA, UVB, or UVC light alone or in combination with other type of UV light. In certain embodiments, the UV light source emits light between about 350 nm and about 400 nm. In some embodiments, the UV light source emits light between about 400 nm and about 500 nm.

The photo-initiator contemplated within the invention is a molecule that, upon irradiation with a given wavelength at a given intensity for a given period of time, generates at least one species capable of catalyzing, triggering or inducing a polymerization or crosslinking. A photo-initiator known in the art may be employed, such as AIBN (azobisisobutyronitrile), AMBN (2-methylbutyronitrile), a benzoin ether, and a phenone derivative such as benzophenone or diethoxyacetophenone.

Non-limiting examples of the photo-initiator contemplated within the invention are: AIBN, AMBN, 1-hydroxy-cyclohexyl-phenyl-ketone (IRGACURE® 184; Ciba, Hawthorne, N.J.); a 1:1 mixture of 1-hydroxy-cyclohexyl-phenyl-ketone and benzophenone (IRGACURE® 500; Ciba, Hawthorne, N.J.); 2-hydroxy-2-methyl-1-phenyl-1-propanone (DAROCUR® 1173; Ciba, Hawthorne, N.J.); 2-hydroxy-1-[4-(2-hydroxyethoxy)phenyl]-2-methyl-1-propanone (IRGACURE® 2959; Ciba, Hawthorne, N.J.); methyl benzoylformate (DAROCUR® MBF; Ciba, Hawthorne, N.J.); oxy-phenyl-acetic acid 2-[2-oxo-2-phenyl-acetoxy-ethoxy]-ethyl ester; oxy-phenyl-acetic 2-[2-hydroxy-ethoxy]-ethyl ester; a mixture of oxy-phenyl-acetic acid 2-[2-oxo-2-phenyl-acetoxy-ethoxy]-ethyl ester and oxy-phenyl-acetic 2-[2-hydroxy-ethoxy]-ethyl ester (IRGACURE® 754; Ciba, Hawthorne, N.J.); alpha,alpha-dimethoxy-alpha-phenylacetophenone (IRGACURE® 651; Ciba, Hawthorne, N.J.); 2-benzyl-2-(dimethylamino)-1-[4-(4-morpholinyl)-phenyl]-1-butanone (IRGACURE® 369; Ciba, Hawthorne, N.J.); 2-methyl-1-[4-(methylthio)phenyl]-2-(4-morpholinyl)-1-propanone (IRGACURE® 907; Ciba, Hawthorne, N.J.); a 3:7 mixture of 2-benzyl-2-(dimethylamino)-1-[4-(4-morpholinyl) phenyl]-1-butanone and alpha,alpha-dimethoxy-alpha-phenylacetophenone per weight (IRGACURE® 1300; Ciba, Hawthorne, N.J.); diphenyl-(2,4,6-trimethylbenzoyl) phosphine oxide (DAROCUR® TPO; Ciba, Hawthorne, N.J.); a 1:1 mixture of diphenyl-(2,4,6-trimethylbenzoyl)-phosphine oxide and 2-hydroxy-2-methyl-1-phenyl-1-propanone (DAROCUR® 4265; Ciba, Hawthorne, N.J.); phenyl bis(2,4,6-trimethyl benzoyl) phosphine oxide, which may be used in pure form (IRGACURE® 819; Ciba, Hawthorne, N.J.) or dispersed in water (45% active, IRGACURE® 819DW; Ciba, Hawthorne, N.J.); a 2:8 mixture of phosphine oxide, phenyl bis(2,4,6-trimethyl benzoyl) and 2-hydroxy-2-methyl-1-phenyl-1-propanone (IRGACURE® 2022; Ciba, Hawthorne, N.J.); IRGACURE® 2100, which comprises phenyl-bis(2,4,6-trimethylbenzoyl)-phosphine oxide); bis-(eta 5-2,4-cyclopentadien-1-yl)-bis-[2,6-difluoro-3-(1H-pyrrol-1-yl) phenyl]-titanium (IRGACURE® 784; Ciba, Hawthorne, N.J.); (4-methylphenyl) [4-(2-methylpropyl) phenyl]-iodonium hexafluorophosphate (IRGACURE® 250; Ciba, Hawthorne, N.J.); 2-(4-methylbenzyl)-2-(dimethylamino)-1-(4-morpholinophenyl)-butan-1-one (IRGACURE® 379; Ciba, Hawthorne, N.J.); 4-(2-hydroxyethoxy)phenyl-(2-hydroxy-2-propyl)ketone (IRGACURE® 2959; Ciba, Hawthorne, N.J.); bis-(2,6-dimethoxybenzoyl)-2,4,4-trimethylpentylphosphine oxide; a mixture of bis-(2,6-dimethoxybenzoyl)-2,4,4-trimethylpentylphosphine oxide and 2-hydroxy-2-methyl-1-phenyl-propanone (IRGACURE® 1700; Ciba, Hawthorne, N.J.); titanium dioxide; and mixtures thereof.

In certain embodiments, one or more accelerators are utilized in the photopolymerization. Amine accelerators can be used as polymerization accelerators, as well as other accelerators. Polymerization accelerators suitable for use are various organic tertiary amines well known in the art. In visible light curable compositions, the tertiary amines are generally acrylate derivatives such as dimethylaminoethyl methacrylate and, particularly, diethylaminoethyl methacrylate (DEAEMA), EDAB and the like, in an amount of about 0.05 to about 0.5 wt %. The tertiary amines are generally aromatic tertiary amines, such as tertiary aromatic amines such as EDAB, 2-[4-(dimethylamino)phenyl]ethanol, N,N-dimethyl-p-toluidine (commonly abbreviated DMPT), bis(hydroxyethyl)-p-toluidine, triethanolamine, and the like. Such accelerators are generally present at about 0.5 to about 4.0 wt % in the polymeric component. In one embodiment, 0.8 wt % EDAB is used in visible light polymerization.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXPERIMENTAL EXAMPLES

The invention is now described with reference to the following Examples. These Examples are provided for the purpose of illustration only, and the invention is not limited to these Examples, but rather encompasses all variations that are evident as a result of the teachings provided herein.

Materials and Instruments:
Materials and Instrumentation for Cp-DIBAC Monomer Synthesis:

All the raw materials for cp-DIBAC synthesis were purchased either from Sigma, VWR or Fisher Scientific and used as supplied. m-Anisidine, m-anisaldehyde, Boc-beta-alanine-OH, hydroxybenzotriazole (HOBT), aluminium chloride trace metal basis (AlCl$_3$), and triethylamine (TEA) were purchased from Sigma Aldrich, N-(3-dimethylaminopropyl)-N'-ethylcarbodiimide hydrochloride (EDC) from VWR international, and trifluoroacetic acid (TFA), acryloyl chloride, and tetrachlorocyclopropene were purchased from Fisher Scientific. Solvents DCM, hexane, ethyl acetate, and methanol (MeOH) were purchased from VWR international and used as supplied.

$^1$H NMR spectra were obtained on a Varian VNMRS 500 MHz spectrometer and processed using Mestrenova 11.0.4. General Procedure to Prepare Linear Polymer with Cp-DIBAC:

Stock solutions of monomer (2M), cp-DIBAC (45 mM), 4-cyano-4-[(dodecylsulfanylthiocarbonyl)sulfanyl]pentanoic acid (RAFT agent, 0.05 M) and ZnTPP (0.002 M) were prepared in DMSO and pipetted into 384-well clear flat-bottom white plates (greiner bio-one) while keeping CTA/ZnTPP ratio at 100:1, monomer/CTA agent ratio at either 200:1 or 400:1; mono-mer/cp-DIBAC ratio was varied depending on the amount of incorporation desired in the final polymer composition. The mixtures were then diluted with DMSO to a final volume of 100 μl and final monomer concentration at 0.5 M. Mixtures were covered with well-plate sealing tape to prevent evaporation and irradiated under 560 nm LED light (B12R30DY, Bulbs.com) for 18 h.

Polymer Purification:

Polymers were purified using Sephadex G-25 spin columns to remove any unreacted cp-DIBAC before deprotection and click addition. Briefly, Sephadex G-25 super fine powder (Sigma Aldrich) was dissolved in DMSO (37.5 mg/mL) and allowed to sit for at least 3 h at RT for the resin to swell. 0.5 mL Zeba spin columns (Thermo Fisher) were loaded manually with the resin and washed three times with DMSO at 1000 g for 1 min. After washing, 60 μL of polymer crude was added on top of the resin and centrifuged at 1000 g for 2 min to obtain the purified sample. UV-VIS spectral absorbance (250-400 nm) of polymer sample before and after purification (2 μL in 98 μL DMSO for measurement) were collected to calculate the percent of cp-DIBAC removed.

Deprotection:

Purified polymer was further diluted in DMSO to a final cp-DIBAC concentration of 5 mM into a 96-well polystyrene flat bottom plate (Denville) with a total volume of 40 μL. Deprotection of cp-DIBAC was completed by placing the 96-well plate under a 365 nm spectroline (R) E-series UV-lamp (Sigma Aldrich) for 15 mins. Deprotection was confirmed by UV-VIS spectroscopy.

Clicking:

Conjugation of 2k PEG-N$_3$ onto polymers was achieved in similar procedure as deprotection; 1 equivalence of PEG-N$_3$ (0.05 M in DMSO), with respect to cp-DIBAC, was added into polymer solutions and left overnight at room temperature to allow complete conjugation. UV-VIS spectrum was collected at the end of reaction time to confirm PEG addition.

Example 1

Cp-DIBAC is synthesized via a five step process and is characterized by UV VIS spectroscopy, mass spectrometry and NMR.

Copolymerization of the monomer was performed in a 96 well plate along with dimethyl acrylamide (DMA monomer) by PET-RAFT in DMSO for incorporation into the polymer backbone. After polymerization, the crude polymer was purified using Sephadex G25 resin to remove any unreacted monomer. The purified polymer was characterized by size exclusion chromatography with multi-angle light scattering (SEC-MALS).

The purified polymer was then irradiated under UV light (365 nm) for 15 mins to unmask the cyclopropenone group and generate the azide-reactive alkyne. PEG-N$_3$ (polyethylene glycol-azide) was then added to the polymer (1:1 azide:alkyne eqiv) to enable SPAAC. This reaction proceeded in less than 1 hour but can generally be left overnight. Molecular weight shifts and conjugation were confirmed by SEC-MALS.

Cyclopropenone-masked Cp-DIBAC did not react with azides under ambient conditions, but very efficiently produced reactive dibenzoazacyclooctynes with UV deprotection. After synthesis, the presence of the cyclopropenone group was confirmed by UV-VIS spectrophotometry (FIG. 1). The UV spectra of Cp-DIBAC in DMSO (FIG. 1, red) showed two close-lying intense bands ($\lambda_{max}$=331 and 347 nm). UV deprotection resulted in the loss of cyclopropenone group and formation of acetylenes (FIG. 1, blue). After deprotection, sodium azide addition resulted in complete loss of the spectrum indicating the formation of triazole, which has no absorbance above 340 nm (FIG. 1, yellow).

In certain embodiments, an exemplary Cp-DIBAC of the invention (0-10 mol %) can be copolymerized into the polymer backbone with good reaction control. Molecular weight shifted after PEG-azide addition are observed confirming SPAAC. Thus, the monomers of the invention are valuable tools for bioconjugation because they can be polymerized and then modified using few synthetic steps.

Example 2

A non-limiting illustrative cp-DIBAC functionalized monomer was synthesized and incorporated into linear polymers by a statistical copolymerization. The cp-DIBAC monomer was prepared by addition of acryloyl chloride to a precursor, followed by cyclization of the dibenzocyclooctynes with tetrachlorocyclopropene. The linker between cp-DIBAC and the acrylate group allowed for enhancing DMSO solubility and providing space from the polymer chain.

The spectra of cp-DIBAC and deprotected DIBAC allow for simple following of these steps by UV-Vis. Cp-DIBAC has a characteristic, two-hump peak between 340-360 nm which quickly drops off above 370 nm (FIG. 1). Deprotection of the cyclopropenone group with UV (290-350 nm) results in a 30 nm blue shift of this spectrum with a new peak between 310-330 nm. Complete conversion to the deprotected DIBAC can be followed by monitoring for remaining absorbance above 350 nm. Subsequent addition of azide results in a fast click reaction and near complete loss of these peaks (FIG. 1). This convenient method therefore allows for online monitoring of the click reaction and for calculating the final concentration of cp-DIBAC against a calibrated concentration ladder.

Linear polymers with cp-DIBAC in the side chains were prepared in 384 or 96 well plates by PET-RAFT copolymerization using ZnTPP as the photoinitiator in DMSO. Monomer concentration was varied between 1.0 or 0.5 M, and ZnTPP/CTA ratio was 0.01 or 0.02 depending on de-sired kinetics and conversion. The stock concentration of cp-DIBAC monomer (1) was 45 mM as this is the solubility limit in DMSO. PET-RAFT polymerization was photoinitiated under a yellow lamp and allowed to polymerize overnight or at selected time points. If desired, relative polymerization conversion can be followed by measuring ZnTPP's fluorescence emission intensities at 632 and 615 nm whereby their ratio is directly related to conversion. After polymerization, polymers are purified to remove free cp-DIBAC and deprotected under UV for 15-25 minutes. During this time, deprotection was followed every five minutes by UV-Vis to verify complete deprotection. After deprotection, the concentration of DIBAC was calculated by UV-Vis and the 1:1 equivalent azide was added for SPAAC. Click was verified by UV-Vis and is typically complete within one hour.

Figure 6A:
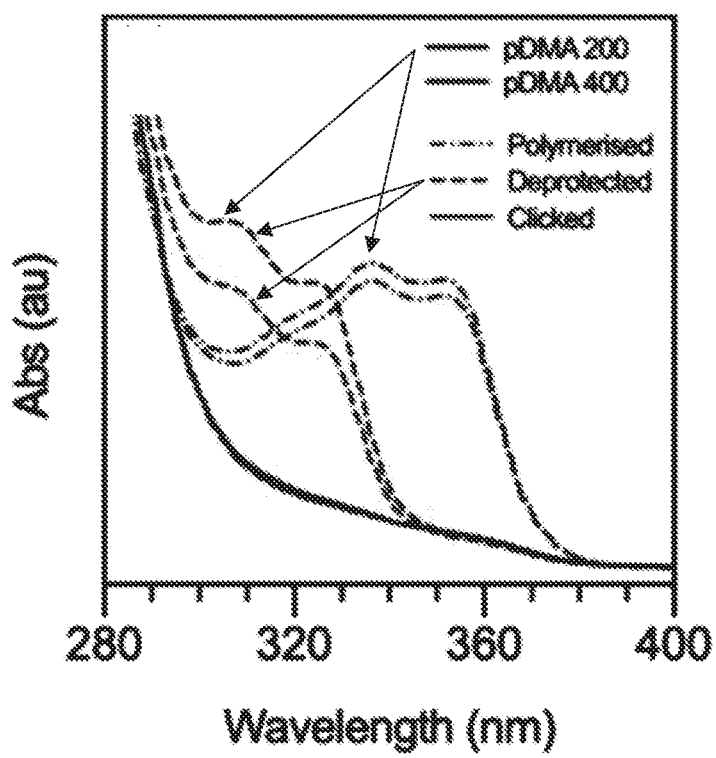
FIGS. 6A-6C illustrate UV-Vis spectra of cp-DIBAC and polymerization kinetics.
Figure 6B:
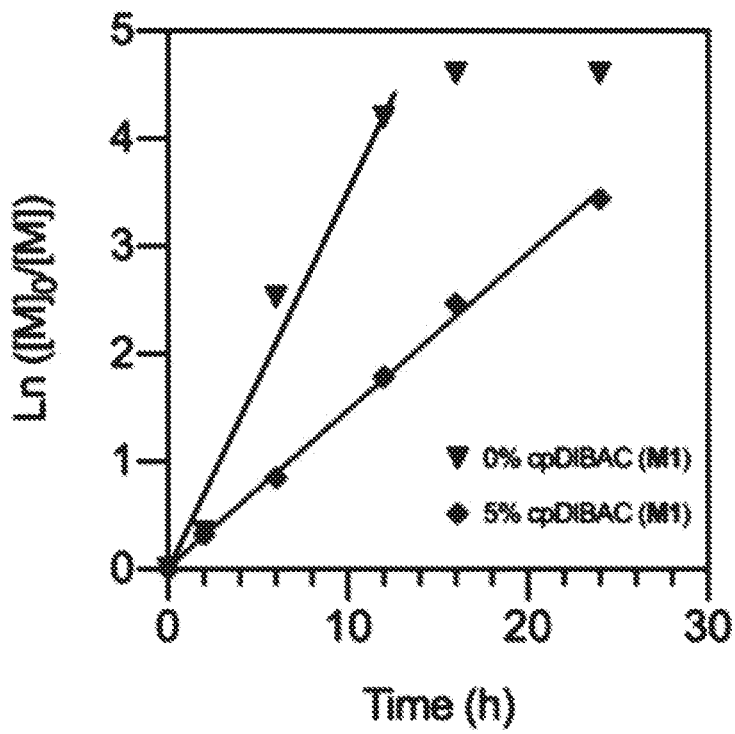
Figure 6C:
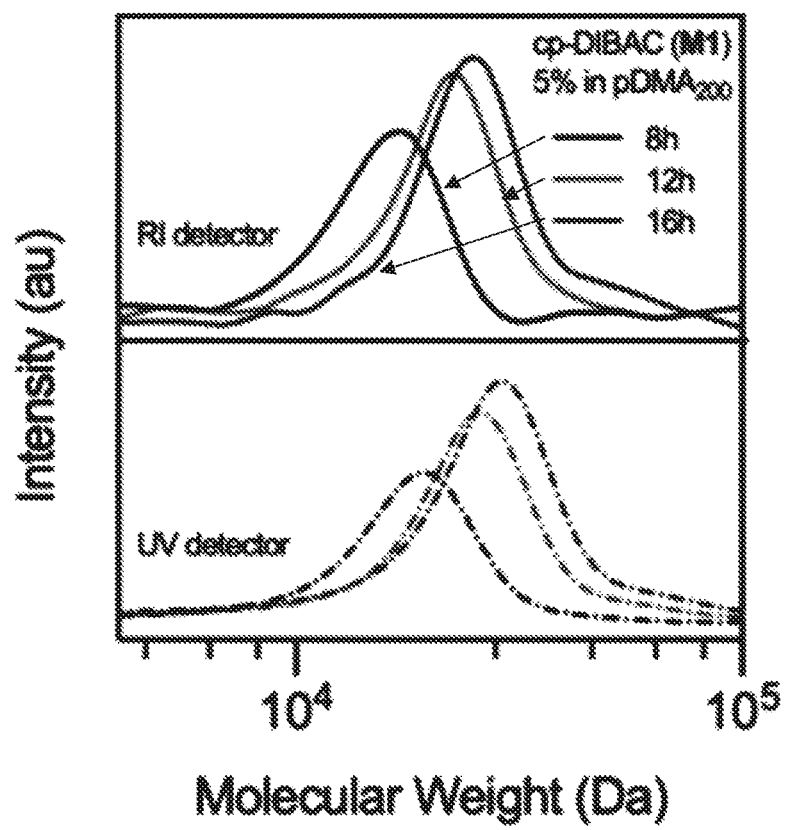
Figure 7A:
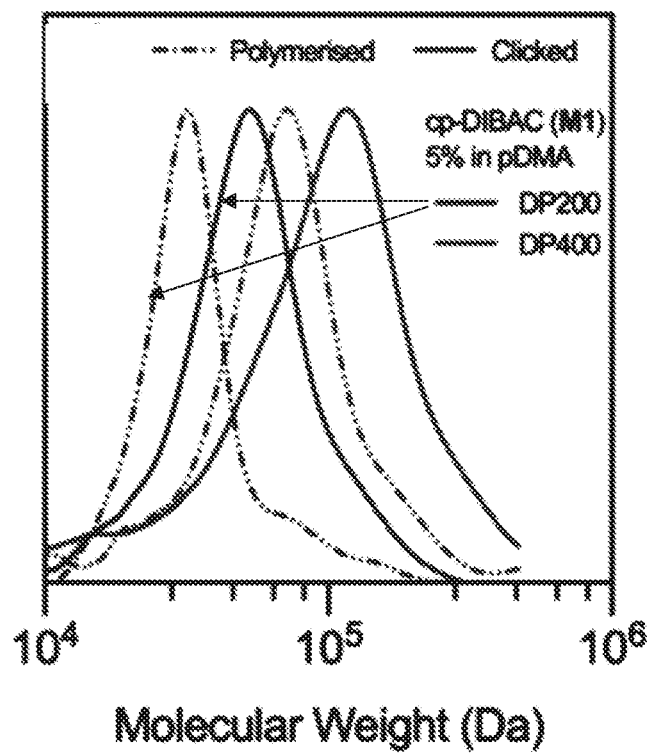
FIGS. 7A-7D illustrate GPC traces showing the copolymerization of cp-DIBAC monomer (1) into side-chain functionalized linear polymers followed by click with 2k PEG-$N_3$.
Figure 7B:
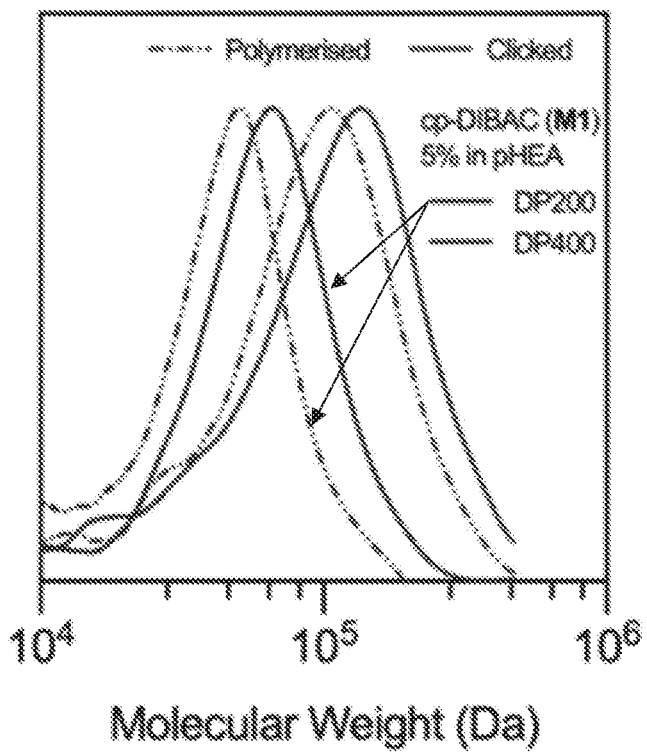
Figure 7C:
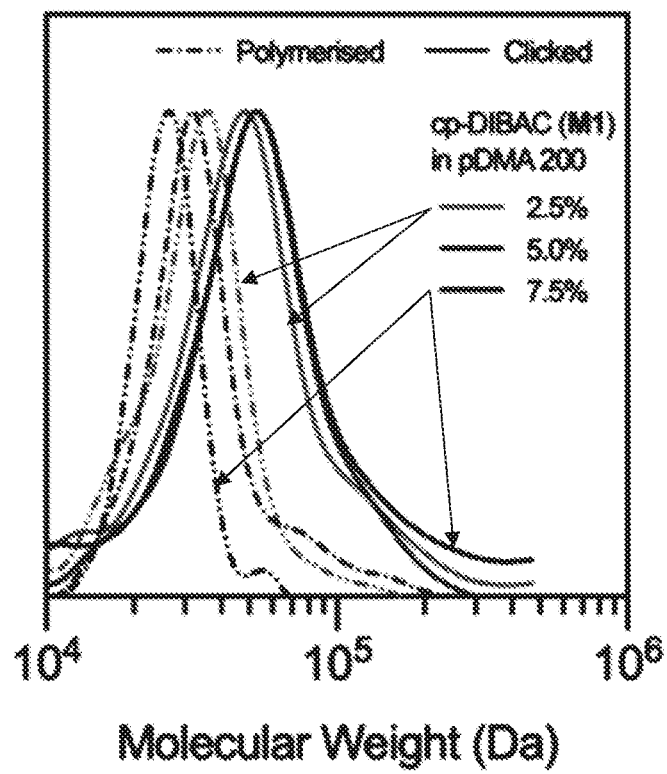
Figure 7D:
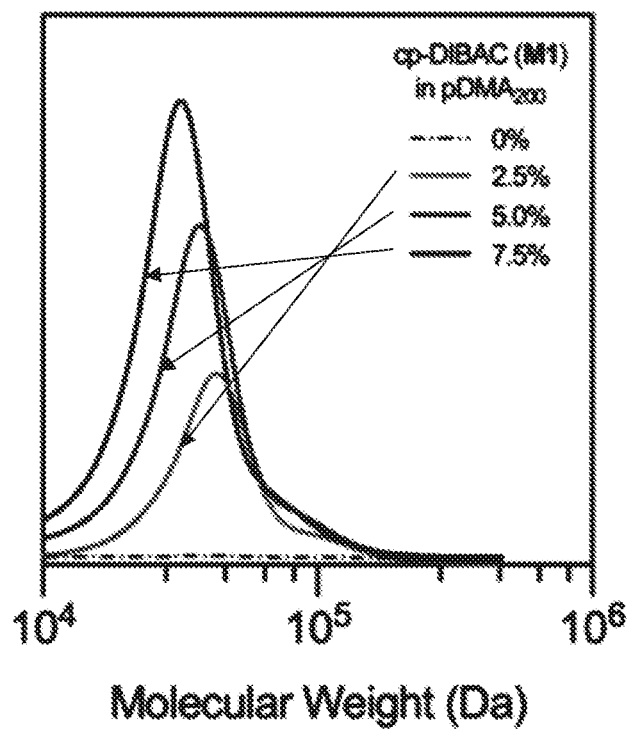
Figure 10:
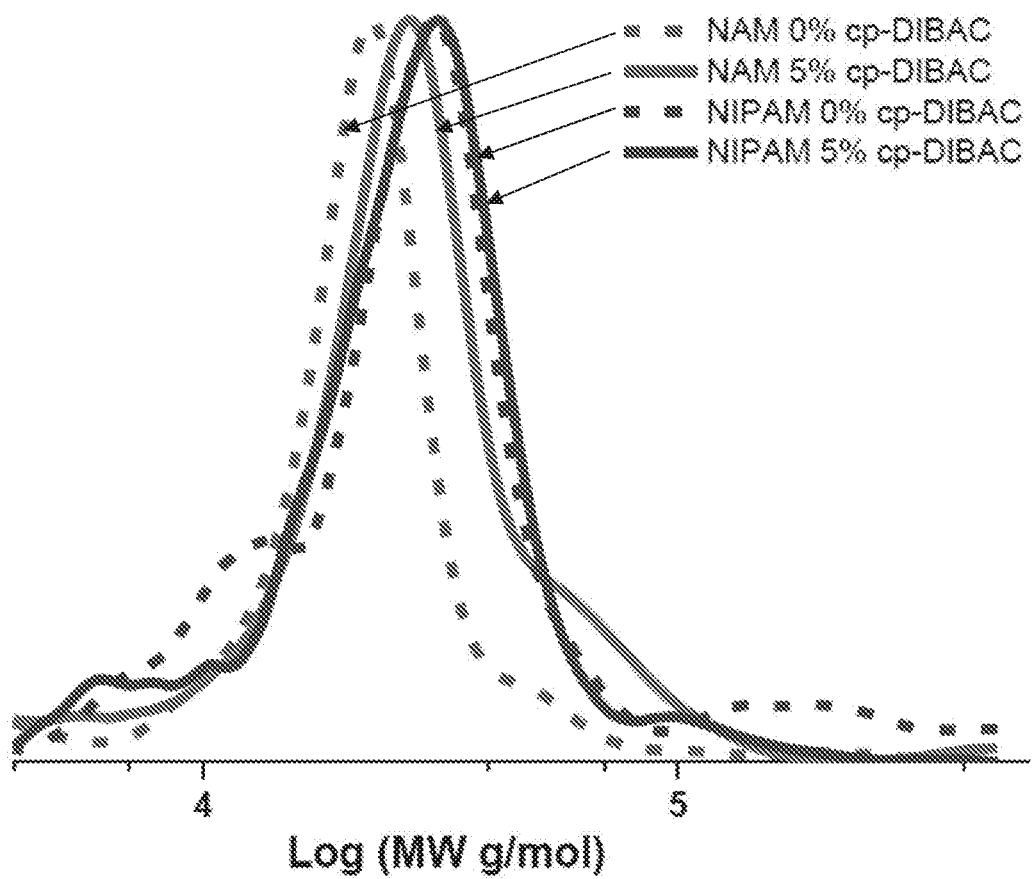
FIG. 10 comprises a graph illustrating the compatibility of copolymers of 4-acryloyl morpholine (NAM) and N-isopropylacrylamide (NIPAM) & 5% cp-DIBAC monomer.

PET-RAFT copolymerization had no effect on cp-DIBAC and its subsequent deprotection and click as verified by UV-Vis (FIG. 6A) and NMR. Copolymerization showed adequate evolution of molecular weight with slightly delayed kinetics. (FIG. 6B). If left for sufficient time, copolymerization with cp-DIBAC proceeds to >90% conversion. For example, when N,N-dimethyacrylamide (DMA) was copolymerized (DP 200 or 400) with 5 mol % cp-DIBAC, molecular weights were 29,091 (Đ=1.15) and 55,032 (Đ=1.27) Daltons, respectively (FIG. 7A, Table 1). After clicking with 2k PEG-$N_3$, these molecular weights shifted to 41,758 (Đ=1.29) and 82,041 (Đ=1.34) Daltons, respectively. This indicates that approximately 7 and 14 PEGs were clicked to the DP 200 and DP 400 polymers, respectively. These click additions match the theoretical number of PEGs that would be clicked at 70% functionalization, indicating remarkable control of post-polymerization modification. It was also found that cp-DIBAC was tolerant to a number of monomers including 2-hydroxyethyl acrylate (HEA) (FIG. 7B), 4-acryloyl morpholine (NAM), and N-isopropylacrylamide respectively (FIG. 10). Evaluation of 2.5, 5, and 7.5% cp-DIBAC copolymerization also showed a reasonable range of obtainable valency with increasing co-monomer input (FIG. 7C). It was not possible to go higher than 7.5% due to solubility limitations in DMSO, however, sulfonation of the cp-DIBAC could be used to facilitate greater solubility if desired. Because of the strong UV extinction coefficient of cp-DIBAC, the UV trace from the GPC provided a reliable indicator for incorporation into the polymer chain (FIG. 7D). By NMR, all polymers (0, 2.5, 5, and 7.5%) proceeded to full conversion with narrow dispersity and should thus have similar molecular weights.

Figure 8A:
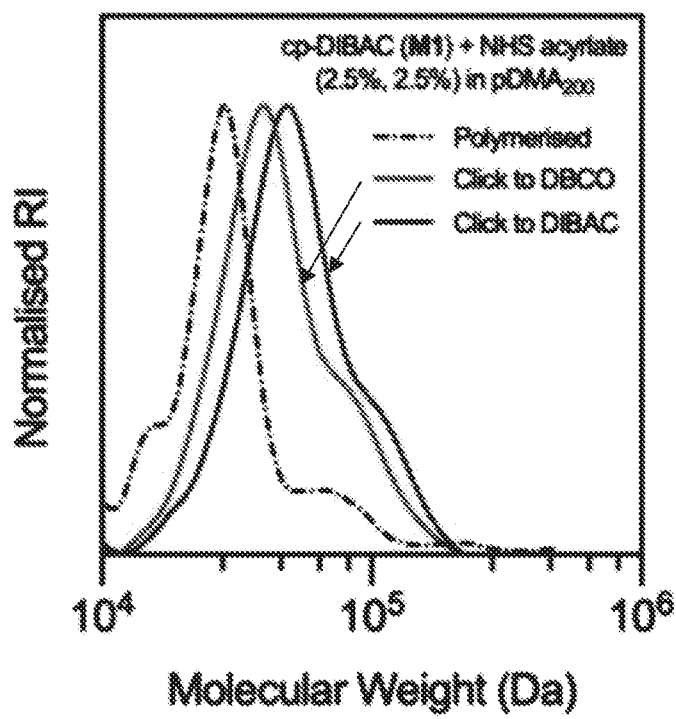
FIGS. 8A-8B illustrate dual functionalization by SPAAC.
Figure 8B:
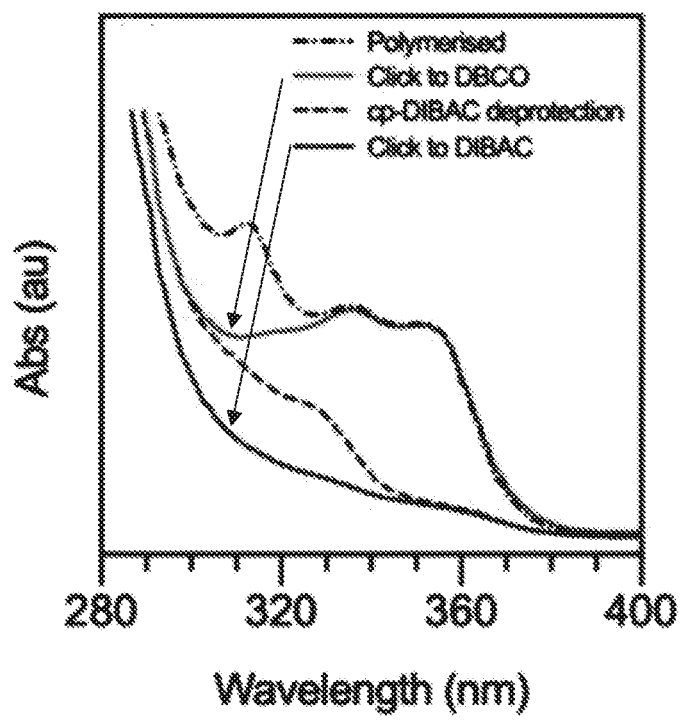
Figure 9A:
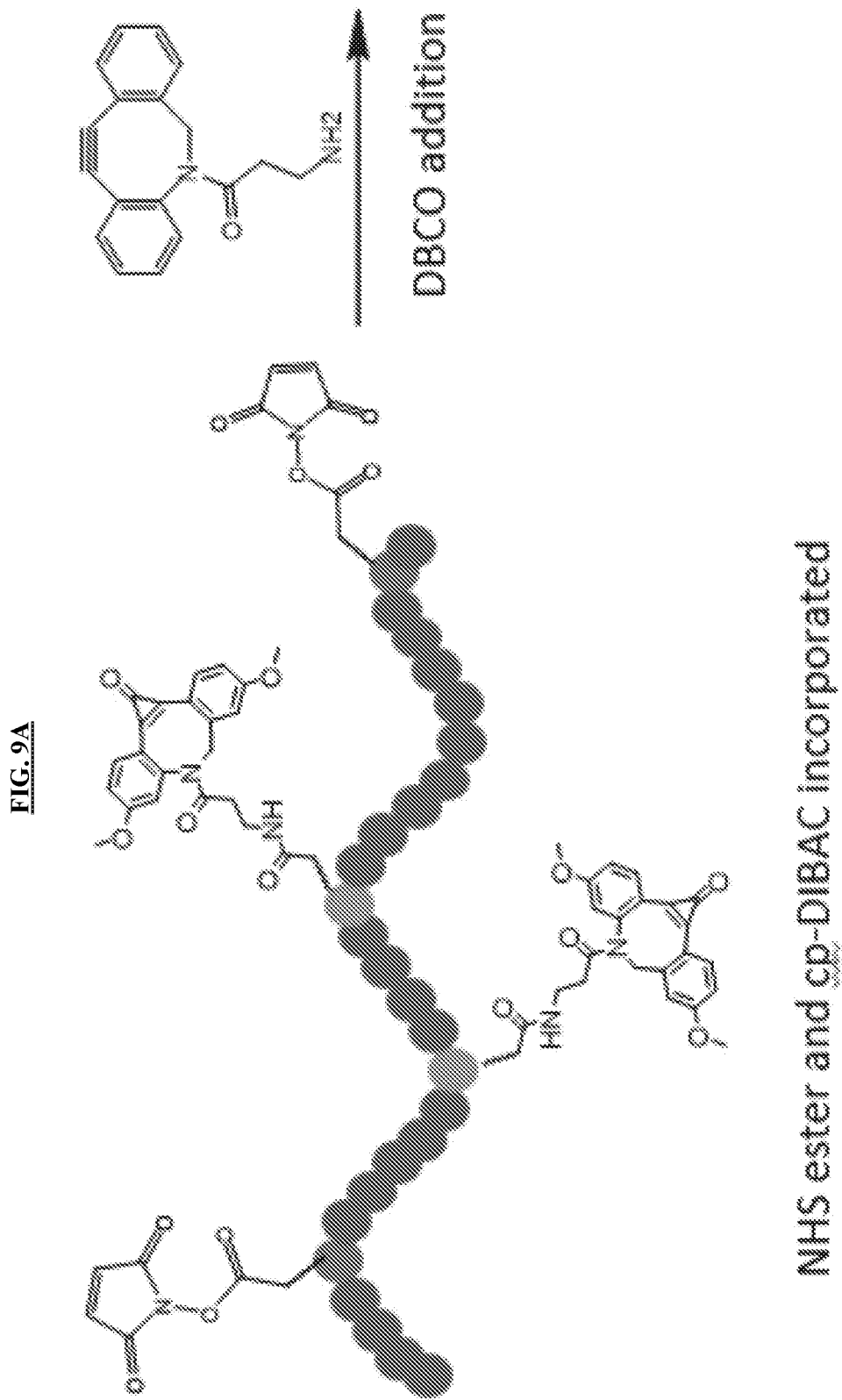
FIGS. 9A-9E comprise a schematic showing dual functionalization capabilities using DBCO and cp-DIBAC via SPAAC.
Figure 9B:
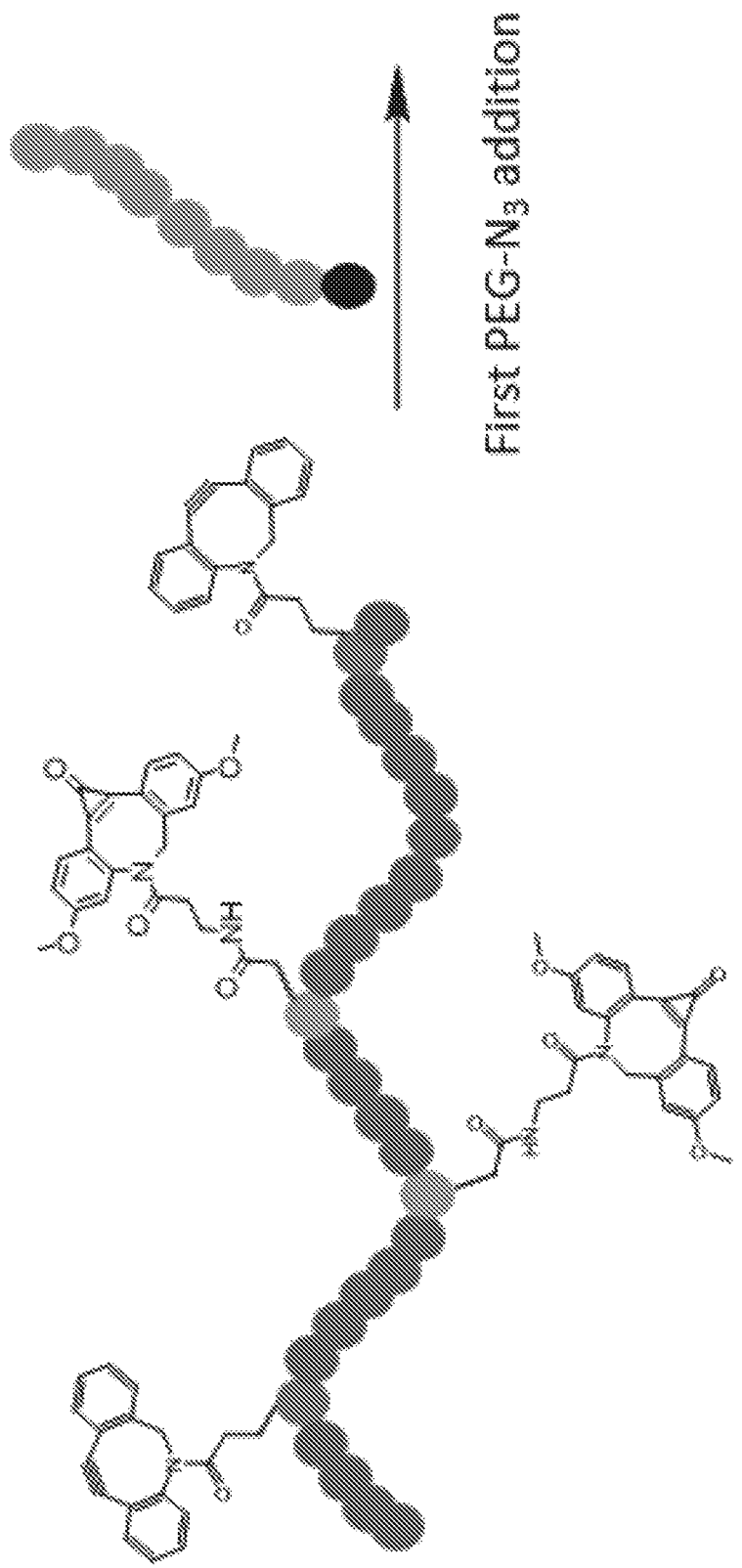
Figure 9C:
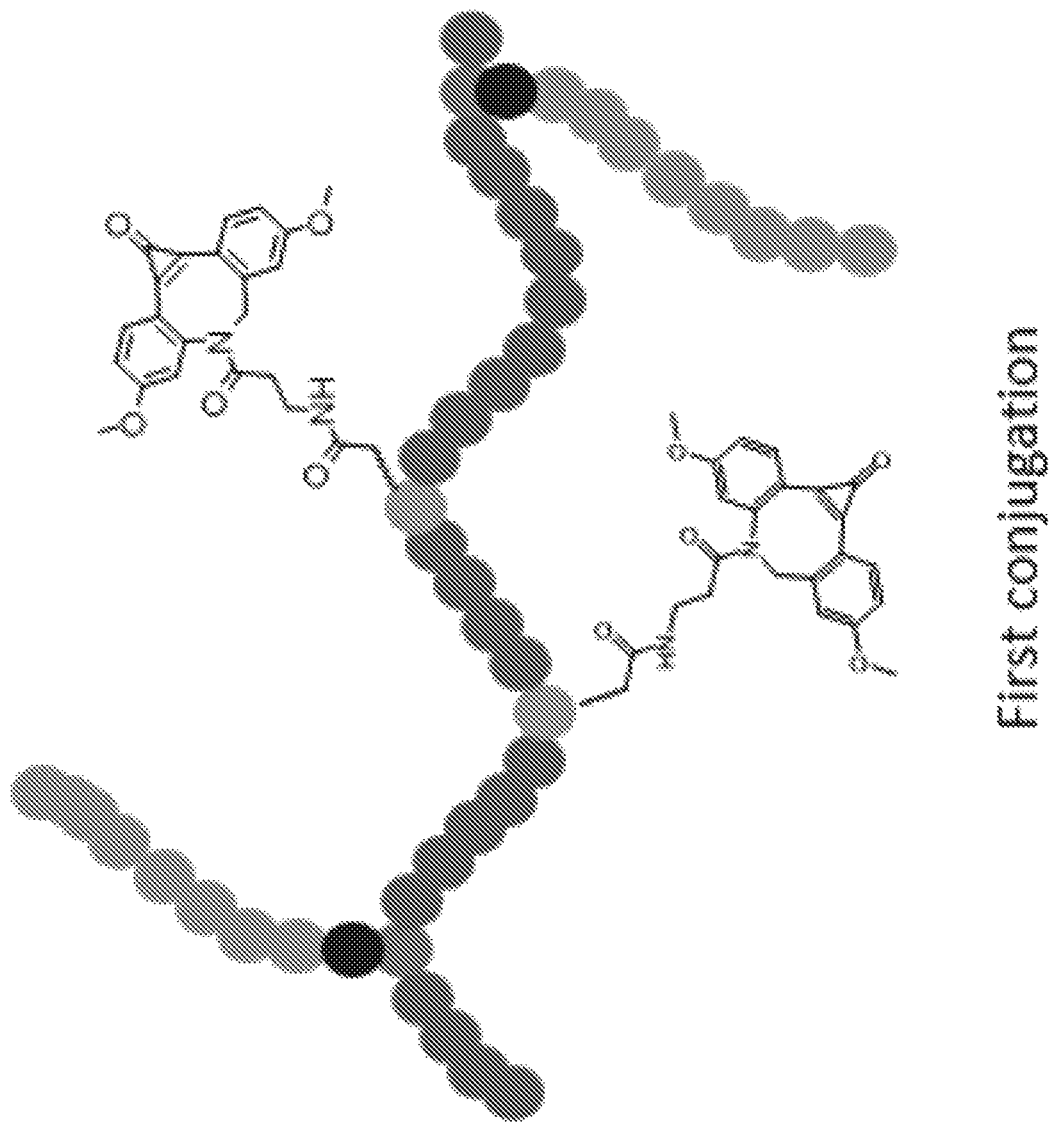
Figure 9D:
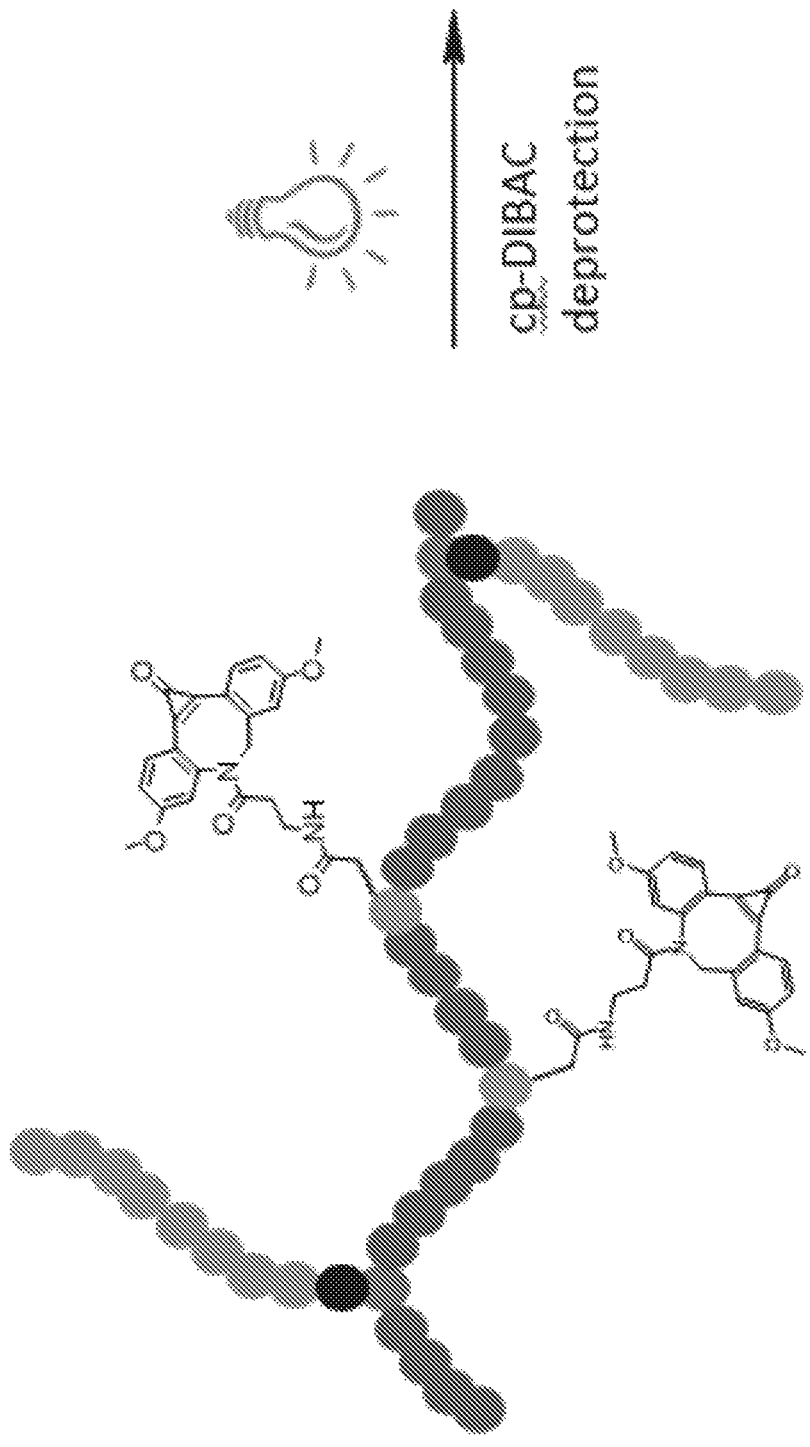
Figure 9E:
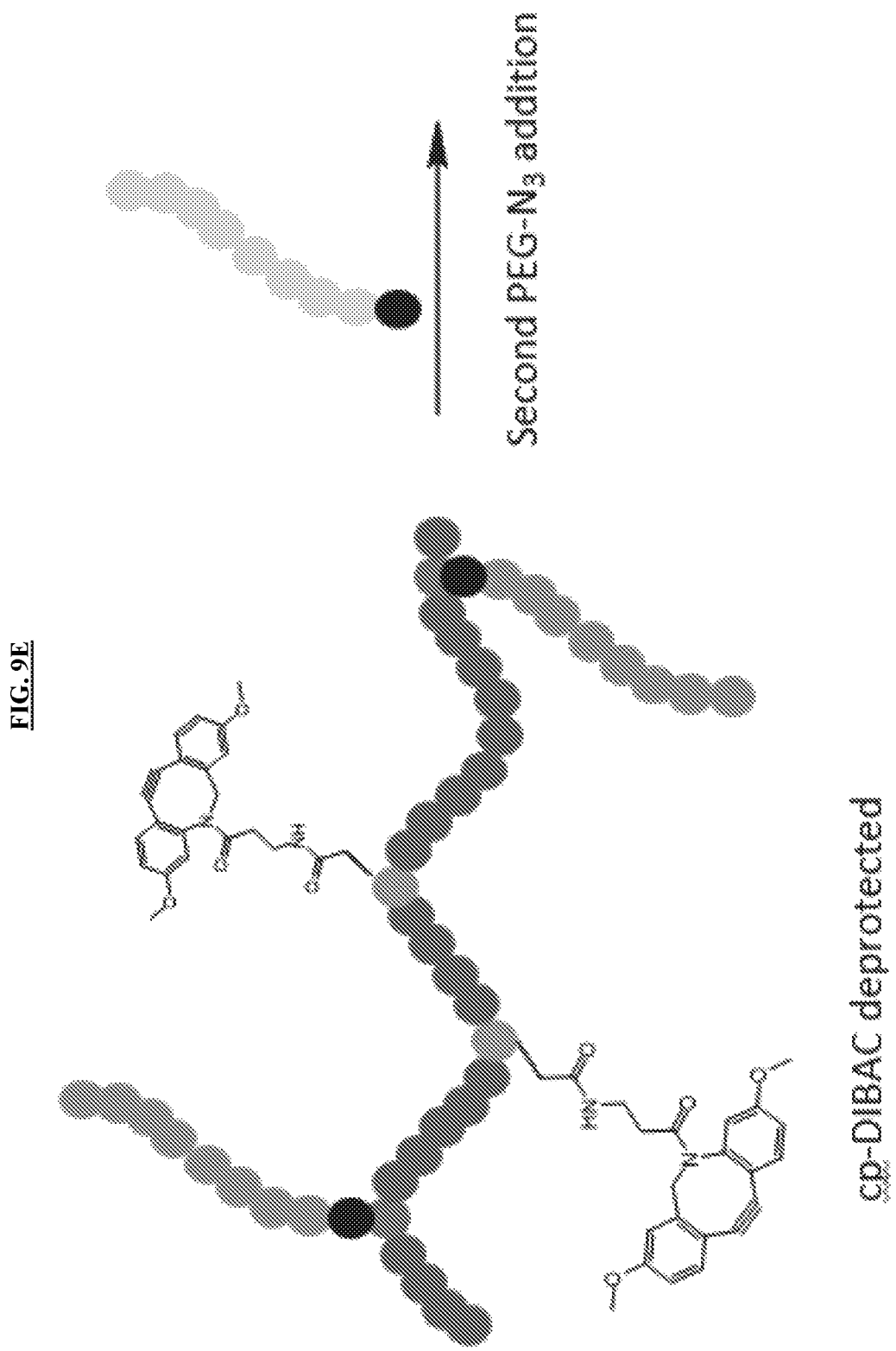
Figure 9F:
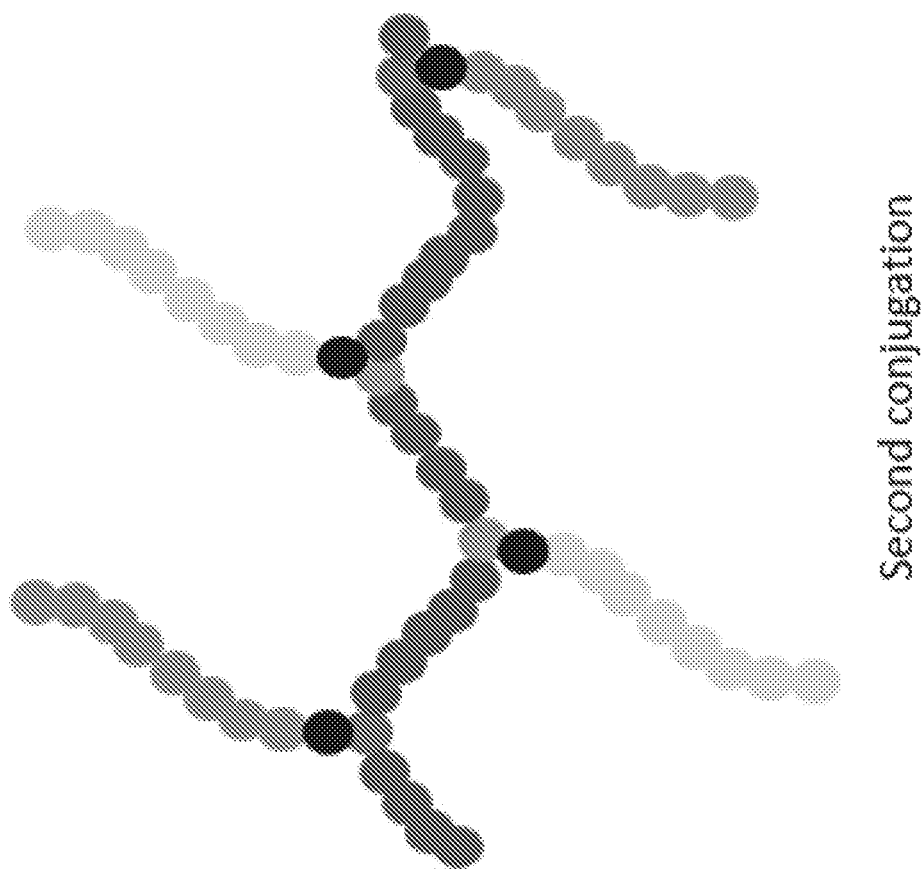

Taking advantage of the cp protected DIBAC, it was explored if this strategy could allow for dual ligand functionalization using the same SPAAC chemistry. In the present case, polymer-DBCO is SPAAC ready. Therefore, in this study 95% monomer, 2.5% NHS-acrylate, and 2.5% cp-DIBAC were copolymerized to make a random heteropolymer with two different DIBACs (one protected and one unprotected). First addition of PEG-azide and clicking to DBCO provided a predictable shift in molecular weight (FIG. 8A) as well as a drop in the UV signal for DBCO at 318 nm (FIG. 8B). Deprotection of cp-DIBAC with UV followed by second PEG-azide addition resulted in another molecular weight shift and corresponding shift then reduction in UV absorption by DIBAC. This indicates that dual functional-ize polymers using SPAAC took place in both cases. This capability is very interesting as this allows for polymers to be functionalized with multiple ligands using by SPAAC. For example, when designing mucin mimetics, it is often desirable to label multivalent polymers with several different glycans in order to mimic the complex chemistry of most glycoproteins.

In conclusion, the present disclosure presents a simplified, dual wave-length, one pot strategy for making multivalent polymers. It takes advantage of the tolerance of cp-DIBAC to radical polymerizations as well as well plate format PET-RAFT to make a highly versatile synthetic platform. This approach works with linear polymers whose ligands are in the side chains. Additional use of DBCO provides a simple avenue for functionalizing multiple ligands to single polymers using the same SPAAC click chemistry for each ligand. Thus, using this synthetic technique, one can imagine making very large and diverse libraries of multivalent polymers with relative ease.

Example 3: Cp-DIBAC Monomer Synthesis

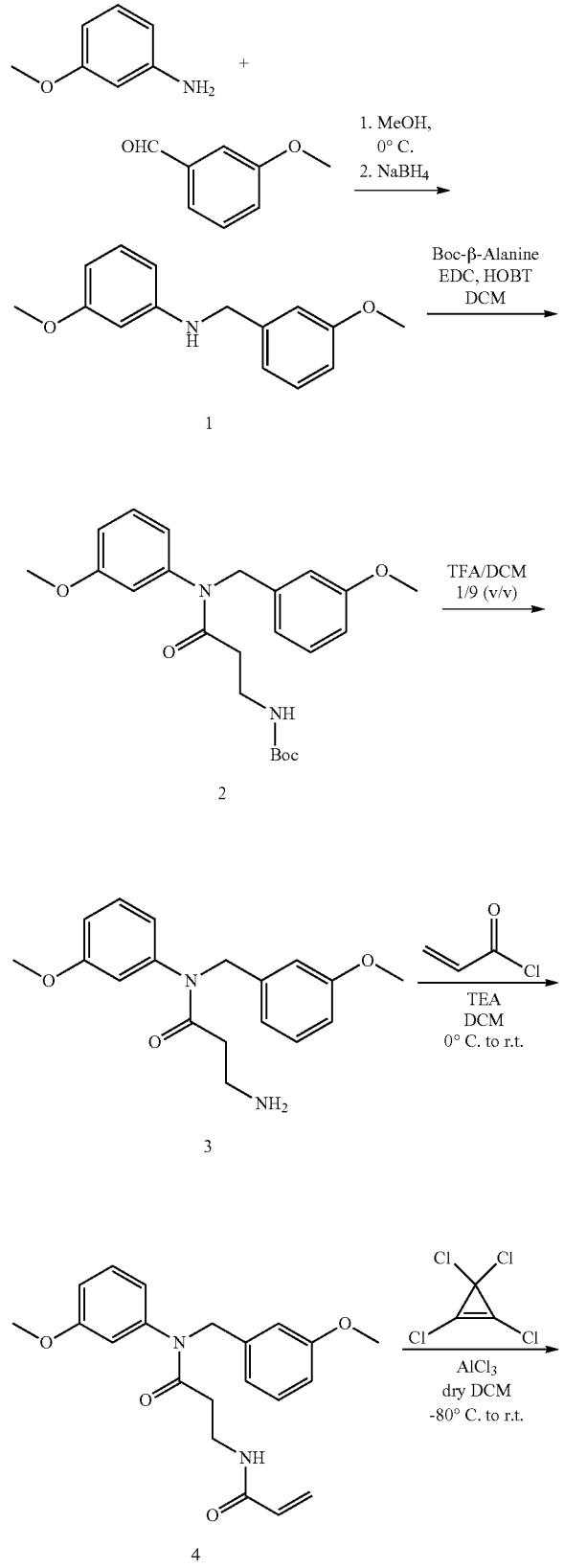

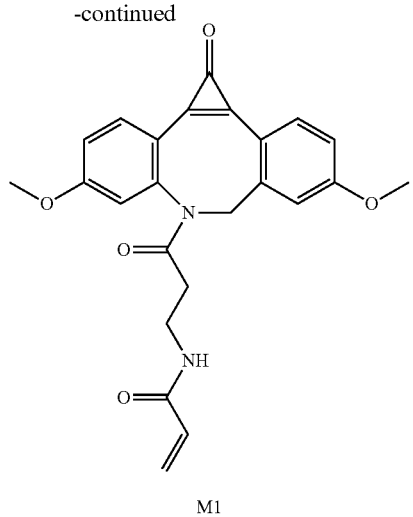

M1

Synthesis of 1:

m-Anisidine (5 g, 40.6 mmol, 1.1 eq), m-anisaldehyde (5.02 g, 36.9 mmol, 1 eq), 100 mL methanol and a magnetic stir bar were added to a 250 ml RBF and allowed to mix for 2 h on an ice bath (0° C.). Sodium borohydride (4.2 g, 220, 3 eq) was added slowly for over a period of 1 h and the mixture was allowed to stir for an additional 2 h on ice prior to work up. 150 mL of deionized water (DI $H_2O$) was added slowly to quench the reaction causing a solid to form and precipitate out. The mixture was then extracted using ethyl acetate (3×100 mL) to separate the organic phase. The organic phase was then washed with 0.5M HCl (2×100 mL) to remove unreacted aniline followed by 2M NaOH (2×100 mL), DI $H_2O$ (2×50 mL), brine (1×100 ml) and finally dried over $Na_2SO_4$ for 10 minutes, filtered, and concentrated in vacuum to obtain a brown liquid. The liquid was air dried overnight to obtain the pure compound 1 (7.9 g, 80% yield). $^1$H NMR (500 MHz, $d_6$-DMSO) δ 7.28-7.16 (m, 1H), 6.91 (tdd, J=7.5, 6.7, 5.6, 2.8 Hz, 3H), 6.80-6.73 (m, 1H), 6.24-6.13 (m, 2H), 6.13-6.04 (m, 2H), 4.20 (dd, J=6.2, 2.1 Hz, 2H), 3.70 (q, J=2.7, 2.2 Hz, 3H), 3.61 (q, J=2.0 Hz, 3H).

Synthesis of 2:

Product 1 (4.5 g, 18.5 mmol, 1 eq) was mixed with Boc-Beta-alanine-OH (4.19 g, 22.14 mmol, 1.2 eq), EDC (4.97 g, 25.89 mmol, 1.4 eq), and HOBT (0.34 g, 2.2 mmol, 0.12 eq) in 100 mL DCM with a stir bar and allowed to mix for 30 h. The organic mixture was then washed with DI water (2×100 mL), 2M NaOH (1×100 mL), DI water (1×100 mL), and finally with brine (1×100 mL) before being dried over $Na_2SO_4$ and concentrated in vacuum. The crude was purified using column chromatography over silica (30:70 ethyl acetate) to yield the product as a brownish-red liquid 2 (3.44 g, 45%). $^1$H NMR (500 MHz, $d_6$-DMSO) δ 7.22 (dt, J=35.0, 7.6 Hz, 2H), 6.88 (d, J=8.2 Hz, 1H), 6.82-6.65 (m, 6H), 4.82 (s, 2H), 4.03 (t, J=7.2 Hz, 1H), 3.70 (s, 6H), 3.41 (s, 1H), 2.28 (s, 2H), 1.34 (s, 9H).

Synthesis of 3:

Product 2 (3.44 g, 8.3 mmol) was dissolved in 50 mL of TFA and DCM (1:9, v:v) and allowed to stir for 4 h at room temperature for Boc deprotection. The resulting solution was washed with 0.1 M $NaHCO_3$ (2×50 mL), DI water (1×50 mL) and finally with brine (1×50 mL) before being dried over $Na_2SO_4$ and concentrated in vacuum to yield the pure product as a dark pink liquid 3 (1.82 g, 70%). Sodium bicarbonate wash was used to completely remove any TFA present. $^1$H NMR (500 MHz, $d_6$-DMSO) δ 7.26 (t, J=8.1 Hz, 1H), 7.18 (t, J=7.9 Hz, 1H), 6.89-6.84 (m, 1H), 6.79-6.68 (m, 5H), 4.80 (s, 2H), 3.68 (d, J=5.6 Hz, 6H), 2.73 (t, J=6.6 Hz, 2H), 2.21 (s, 2H). (d, J=8.5 Hz, 1H), 7.07 (d, J=8.1 Hz, 1H), 6.06-5.89 (m, 2H), 5.48 (d, J=9.6 Hz, 1H), 5.04 (d, J=14.6 Hz, 1H), 4.23 (d, J=14.8 Hz, 1H), 3.89 (s, 6H), 3.16 (s, 1H), 3.01 (s, 1H), 2.04-1.90 (m, 1H).

TABLE 1

$^1$H NMR and GPC results of cp-DIBAC copolymerized linear polymers before and after clicking.

| # | Monomer | DP$_{targ}$ (total) | % (mol) 1 | X (%) | polymerised | | | clicked | |
|---|---------|---------------------|-----------|-------|-------------|---|---|---------|---|
|   |         |                     |           |       | $M_{n, theo}$ | $M_{n, GPC}$ | Đ | $M_{n, GPC}$ | Đ |
| 1 | DMA | 200 | 2.5 | 98 | 21.9 | 27.7 | 1.15 | 37.7 | 1.29 |
| 2 | DMA | 200 | 5   | 95 | 23.5 | 29.1 | 1.15 | 41.7 | 1.30 |
| 3 | DMA | 200 | 7.5 | 91 | 25.3 | 23.6 | 1.11 | 46.1 | 1.26 |
| 4 | DMA | 400 | 5   | 92 | 46.7 | 55.1 | 1.27 | 82.1 | 1.34 |
| 5 | HEA | 200 | 5   | 93 | 26.6 | 40.4 | 1.27 | 51.2 | 1.26 |
| 6 | HEA | 400 | 5   | 89 | 52.9 | 70.6 | 1.44 | 94.3 | 1.35 |

Synthesis of 4:

Product 3 (1.82 g, 5.79 mmol, 1 eq) was mixed with 50 mL of DCM in a 100 mL RBF with a magnetic stir bar and the opening was closed with a rubber septum and the setup was placed on an ice bath at 0° C. TEA (1.61 mL, 11.58 mmol, 2 eq) was added dropwise to the mixture using a syringe and was allowed to stir for half an hour at 0° C. Acryloyl chloride (470 µL, 5.79 mmol, 1 eq) was then added dropwise carefully and the mixture was allowed to stir on the ice bath for an additional 2 h. After removing from ice bath, the reaction was allowed to proceed for additional 16 h before quenching it with 10 mL of methanol. The resulting solution was then washed with 0.1 M HCl (1×50 mL), DI water (2×50 mL) and finally with brine (1×50 mL) before being dried over $Na_2SO_4$ and concentrated in vacuum. The crude was then purified with column chromatography over silica using 5% MeOH in DCM to obtain the product as alight pink liquid (1.109 g, 52%). $^1$H NMR (500 MHz, $d_6$-DMSO) δ 8.08 (s, 1H), 7.21 (dtd, J=34.6, 8.0, 1.5 Hz, 2H), 6.90-6.83 (m, 1H), 6.79-6.66 (m, 5H), 6.15 (ddd, J=17.1, 10.2, 1.5 Hz, 1H), 6.00 (dt, J=17.2, 2.0 Hz, 1H), 5.51 (dt, J=10.1, 1.9 Hz, 1H), 4.81 (s, 2H), 3.68 (d, J=1.5 Hz, 6H), 2.30 (t, J=7.0 Hz, 2H).

Synthesis of M1:

50 mL of anhydrous DCM was added to a 100 ml two neck round bottom flask with a stir bar (one port with $N_2$ inlet and the other closed with a septum) and was cooled in an acetone-dry ice bath to −80° C. $N_2$ exhaust was removed after 10 mins and $AlCl_3$ (1.60 g, 12.04 mmol, 4 eq) was added very quickly and the inlet was closed once again. Tetrachlorocyclopropene (591 µL, 4.82 mmol, 1.6 eq) was added dropwise to the mixture through the septum via syringe-needle system and was allowed to stir for an hour at −80° C. Product 4 (1.109 g, 3.01 mmol, 1 eq) was dissolved in 5 mL of anhydrous DCM and was added dropwise very slowly for over a period of one hour. After the addition of 4, the reaction mixture was allowed to stir at −80° C. for another 2.5 h and later at room temperature overnight (16 h). The reaction was quenched by adding 10% HCl (10 ml) and was allowed to stir for another 5 min. The organic mixture was extracted with 50 mL of hexane and then washed with DI water (2×100 mL) and brine (1×50) before being dried over $Na_2SO_4$ and concentrated in vacuum. The crude was purified by column chromatography over silica (10% methanol in DCM) to yield M1 as a pale white solid (138 mg, 11%). $^1$H NMR (500 MHz, $d_6$-DMSO) δ 7.89 (d, J=5.6 Hz, 2H), 7.74 (d, J=7.8 Hz, 1H), 7.28 (d, J=11.1 Hz, 2H), 7.17

TABLE 2

GPC characterisation of NAM and NIPAAM linear polymers prepared with 0% and 5% cp-DIBAC (M1).

| Monomer | % cp-DIBAC | DP | $M_{n, Theo}$ | $M_{n, GPC}$ | $M_{w, GPC}$ | Đ |
|---------|-----------|-----|---------------|--------------|--------------|------|
| HAM     | 0 | 200 | 28603 | 19893 | 22386 | 1.12 |
| NAM     | 5 | 200 | 31183 | 24006 | 29026 | 1.20 |
| NIPAM   | 0 | 200 | 23003 | 26974 | 30068 | 1.11 |
| NIPAM   | 5 | 200 | 26053 | 25199 | 28420 | 1.12 |

TABLE 3

Dual conjugation study molecular weight data for DMA DP 200 2.5% DBCO 2.5% cp-DIBAC composition.

| Polymer | $M_{n, Theo}$ | $M_{n, GPC}$ | $M_{w, GPC}$ | Đ |
|---------|---------------|--------------|--------------|------|
| DMA 0% NHS 0% cp-DIBAC | 20203 | 23128 | 24997 | 1.08 |
| DMA 2.5% NHS 2.5% cp-DIBAC | 22735 | 23605 | 26163 | 1.10 |
| First PEG addition |  | 36027 | 45534 | 1.26 |
| Second PEG addition |  | 43220 | 53774 | 1.24 |

TABLE 4

DMA DP 200 5% cp-DIBAC molecular weight data at various time points.

| DMA 5% cp-DIBAC (DP 200) | $M_{n, GPC}$ | $M_{w, GPC}$ | Đ |
|--------------------------|--------------|--------------|------|
| t = 8 h  | 14601 | 15746 | 1.078 |
| t = 12 h | 19149 | 21865 | 1.14 |
| t = 16 h | 22976 | 27272 | 1.18 |

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A compound comprising
an α,β-unsaturated carboxamide C(R')$_2$=C(R")—C(=O)NH— group or
α,β-unsaturated sulfonamide C(R')$_2$=C(R")—S(=O)$_2$NH— group
conjugated to a group of formula (I):

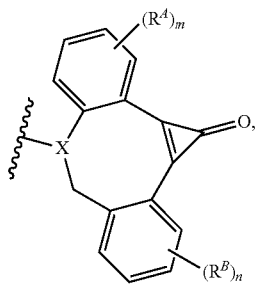

wherein (I) is conjugated through a linker of formula (II) to the nitrogen atom of the α,β-unsaturated carboxamide group or α,β-unsaturated sulfonamide group, wherein bond * in (II) is to the nitrogen of the α,β-unsaturated carboxamide or α,β-unsaturated sulfonamide group and bond ** in (II) is to atom X of (I):

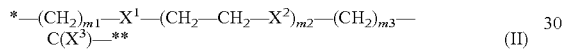

wherein:
each occurrence of R' and R" is independently hydrogen, $C_1$-$C_6$ alkyl, substituted $C_1$-$C_6$ alkyl, $C_3$-$C_8$ cycloalkyl, or substituted $C_3$-$C_8$ cycloalkyl;

X is N or CH;

each occurrence of $R^A$ is independently H, F, Cl, Br, I, —CN, —NO$_2$, —OR$^C$, —SR$^C$, —S(=O)$_{1-2}$R$^C$, —N(R$^C$)$_2$, —NR$^C$C(=O)R$^C$, —C(=O)N(R$^C$)$_2$, —NR$^C$C(=O)N(R$^C$)$_2$, —S(=O)$_2$N(R$^C$)$_2$, —C(=O)R$^C$, —C(=O)OR$^C$, $C_1$-$C_6$ alkyl, $C_1$-$C_6$ haloalkyl, $C_1$-$C_6$ alkoxy, $C_1$-$C_6$ haloalkoxy, $C_3$-$C_8$ cycloalkyl, phenyl, heterocyclyl, or heteroaryl, wherein each occurrence of R$^C$ is independently selected from the group consisting of hydrogen, —OR$^E$, —SR$^E$, —C(=O)R$^E$, —C(=O)OR$^E$, —C(=O)N(R$^E$)$_2$, —S(=O)$_{1-2}$R$^E$, —N(R$^E$)$_2$, —NR$^E$C(=O)R$^E$, $C_1$-$C_6$ alkyl, $C_1$-$C_6$ haloalkyl, $C_3$-$C_6$ cycloalkyl, and phenyl, or two R$^E$ units taken together with the atom(s) to which they are bound form a 3-7 membered ring, wherein the alkyl, haloalkyl, cycloalkyl, or phenyl in R$^A$ and/or R$^C$ is independently optionally substituted with at least one substituent independently selected from —OR$^E$; —C(=O)R$^E$; —C(=O)OR$^E$; —C(=O)N(R$^E$)$_2$; N(R$^E$)$_2$; halogen; CH$_2$F; CHF$_2$; CF$_3$; CH$_2$Cl; CHCl$_2$; CCl$_3$; CH$_2$Br; CHBr$_2$; CBr$_3$; CH$_2$I; CHI$_2$; CI$_3$; —S(=O)$_2$R$^E$; $C_1$-$C_6$ alkyl; —CN; —N(R$^E$)C(=O)R$^E$; oxo (=O); heterocyclyl; and heteroaryl;

wherein each R$^E$ is independently selected from the group consisting of hydrogen, $C_1$-$C_6$ alkyl, substituted $C_1$-$C_6$ alkyl, $C_3$-$C_8$ cycloalkyl, and substituted $C_3$-$C_8$ cycloalkyl; or two R$^E$ units can be taken together to form a ring comprising 3-7 ring atoms;

each occurrence of R$^B$ is independently H, F, Cl, Br, I, —CN, —NO$_2$, —OR$^D$, —SR$^5$, —S(=O)$_{1-2}$R$^D$, —N(R$^D$)$_2$, —NR$^D$C(=O)R$^D$, —C(=O)N(R$^D$)$_2$, —NR$^D$C(=O)N(R$^D$)$_2$, —S(=O)$_2$N(R$^D$)$_2$, —C(=O)R$^D$, —C(=O)OR$^D$, $C_1$-$C_6$ alkyl, $C_1$-$C_6$ haloalkyl, $C_1$-$C_6$ alkoxy, $C_1$-$C_6$ haloalkoxy, $C_3$-$C_8$ cycloalkyl, phenyl, heterocyclyl, or heteroaryl, wherein each occurrence of R$^D$ is independently selected from the group consisting of hydrogen, —OR$^F$, —SR$^F$, —C(=O)R$^F$, —C(=O)OR$^F$, —C(=O)N(R$^F$)$_2$, —S(=O)$_{1-2}$R$^F$, —N(R$^F$)$_2$, —NR$^F$C(=O)R$^F$, $C_1$-$C_6$ alkyl, $C_1$-$C_6$ haloalkyl, $C_3$-$C_6$ cycloalkyl, and phenyl, or two R$^F$ units taken together with the atom(s) to which they are bound form a 3-7 membered ring, wherein the alkyl, haloalkyl, cycloalkyl, or phenyl in R$^B$ and R$^D$ is independently optionally substituted with at least one substituent independently selected from —OR$^F$; —C(=O)R$^F$; —C(=O)OR$^F$; —C(=O)N(R$^F$)$_2$; N(R$^F$)$_2$; halogen; CH$_2$F; CHF$_2$; CF$_3$; CH$_2$Cl; CHCl$_2$; CCl$_3$; CH$_2$Br; CHBr$_2$; CBr$_3$; CH$_2$I; CHI$_2$; CI$_3$; —S(=O)$_2$R$^F$; $C_1$-$C_6$ alkyl; —CN; —N(R$^F$)C(=O)R$^F$; oxo (=O); heterocyclyl; and heteroaryl;

wherein each R$^F$ is independently selected from the group consisting of hydrogen, $C_1$-$C_6$ alkyl, substituted $C_1$-$C_6$ alkyl, $C_3$-$C_8$ cycloalkyl, and substituted $C_3$-$C_8$ cycloalkyl; or two R$^F$ units can be taken together to form a ring comprising 3-7 ring atoms;

m is 0, 1, 2, 3, or 4;

n is 0, 1, 2, 3, or 4;

each of m1, m2, and m3 are independently 0, 1, 2, 3, 4, 5, 6, 7, 8, 9, or 10;

each of $X^1$, $X^2$, and $X^3$ are independently absent (a bond), O, or N—R$^3$, each R$^3$ is independently selected from the group consisting of hydrogen, $C_1$-$C_6$ alkyl, substituted $C_1$-$C_6$ alkyl, $C_3$-$C_8$ cycloalkyl, substituted $C_3$-$C_8$ cycloalkyl, $C_3$-$C_8$ cycloheteroalkyl, and substituted $C_3$-$C_8$ cycloheteroalkyl;

or a salt or solvate thereof.

2. The compound of claim 1, wherein X is N.

3. The compound of claim 1, wherein at least one applies:
at least one R$^A$ is —OR$^C$,
at least one R$^B$ is —OR$^D$.

4. The compound of claim 1, wherein (I) is:

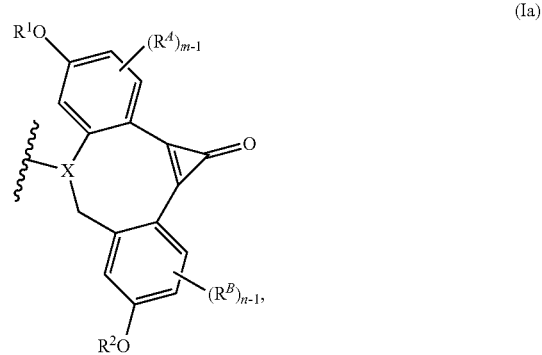

wherein:
R$^1$ and R$^2$ are independently selected from the group consisting of H, $C_1$-$C_6$ alkyl, substituted $C_1$-$C_6$ alkyl, $C_3$-$C_8$ cycloalkyl, substituted $C_3$-$C_8$ cycloalkyl;
m is 1, 2, 3, or 4; and
n is 1, 2, 3, or 4.

5. The compound of claim 4, wherein (I) is:

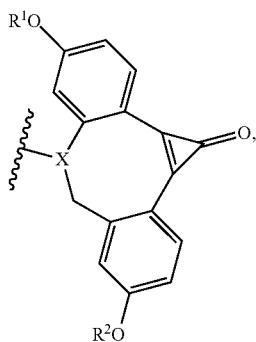

(Ib)

wherein $R^1$ and $R^2$ are independently selected from the group consisting of H, $C_1$-$C_6$ alkyl, substituted $C_1$-$C_6$ alkyl, $C_3$-$C_8$ cycloalkyl, and substituted $C_3$-$C_8$ cycloalkyl.

6. The compound of claim 4, wherein $R^1$ and $R^2$ are both methyl.

7. The compound of claim 1, wherein the linker comprises the formula:

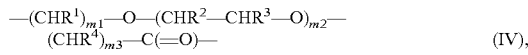

(IV), wherein:
the amide nitrogen of the α,β-unsaturated carboxamide or sulfonamide group is covalently bonded to —$(CHR^1)_{m1}$—, and (I) is covalently bonded to C(=O)—;
each m1, m2, and m3 is independently 0, 1, 2, 3, 4, 5, 6, 7, 8, 9, or 10;
each of $R^1$, $R^2$, $R^3$, and $R^4$ is hydrogen.

8. The compound of claim 1, wherein the linker comprises at least one of:
(a) a polyethylene glycol chain ranging in size from about 1 to about 12 ethylene glycol units; and
(b) 1-20 methylene groups or substituted methylene groups.

9. The compound of claim 1, which is:

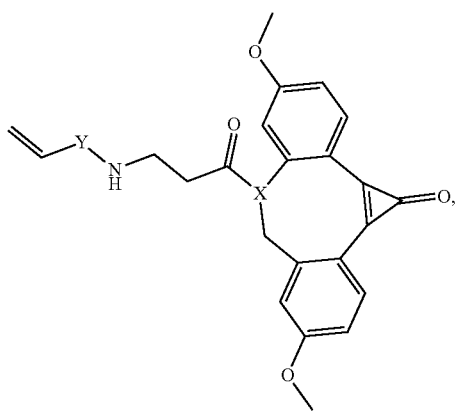

(V)

wherein Y is C(=O) or S(=O)$_2$.

10. A polymer comprising the at least partially polymerized compound of claim 1, wherein the at least partially polymerized compound is optionally:
(a) not cross-linked therein and the polymer is linear;
(b) at least partially cross-linked; or
(c) at least partially cross-linked by a bis-acrylate cross-linking reagent.

11. The polymer of claim 10, wherein the bis-acrylate cross-linking agent is selected from the group consisting of ethylene glycol dimethacrylate, tetraethyleneglycol-dimethacrylate, poly(ethylene glycol) dimethacrylates, the condensation product of bisphenol A and glycidyl methacrylate, 2,2'-bis [4-(3-methacryloxy-2-hydroxypropoxy)-phenyl] propane, hexanediol dimethacrylate, tripropylene glycol dimethacrylate, butanediol dimethacrylate, neopentyl glycol dimethacrylate, diethylene glycol dimethacrylate, triethylene glycol dimethacrylate, dipropylene glycol dimethacrylate, allyl methacrylate trimethylolpropane triacrylate, tricyclodecane dimethanol diacrylate, and any combinations thereof.

12. The polymer of claim 10, which further comprises at least one group of formula (VI):

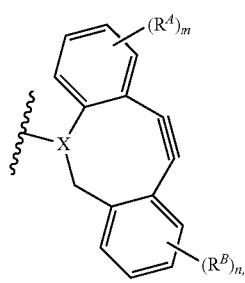

(VI)

wherein X, $R^A$, m, $R^B$, and n in (VI) are independently defined in claim 1.

13. The polymer of claim 12, which is reacted with an azido-containing compound to generate one of the following:

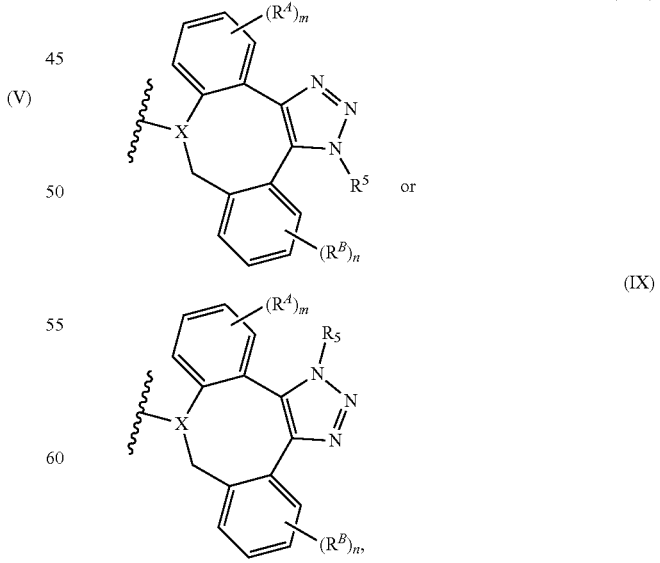

(VIII)

or (IX)

wherein $R^5$ is a small molecule, therapeutic agent, or macromolecule.

14. A method of derivatizing at least a portion of the polymer of claim 12 with one or more small molecules, therapeutic agents, or macromolecules, the method comprising contacting the polymer of claim 12 with $N_3$—$R^{5A}$, wherein $R^{5A}$ is a small molecule, therapeutic agent, or macromolecule, under conditions that allow for reaction between (VI) and $N_3$—$R^{5A}$;

irradiating the resulting polymer to convert at least one group (I) to the corresponding group (VI), and contacting the irradiated material with $N_3$—$R^{5B}$, wherein $R^5$ is an independently selected small molecule, therapeutic agent, or macromolecule, under conditions that allow for reaction between (VI) and $N_3$—$R^{5B}$.

15. The method of claim 14, wherein the radiation used is around 365 nm.

16. The method of claim 14, wherein the derivatized polymer does not release significant amounts of the small molecule, therapeutic agent, or macromolecule when contacted with a cell or tissue in vitro or in vivo.

17. A method of derivatizing a small molecule, therapeutic agent, or a macromolecule with at least one compound of claim 1, the method comprising contacting the small molecule, therapeutic agent, or a macromolecule comprising a thiol group with the at least one compound of claim 1.

18. The method of claim 14, wherein each of the one or more small molecules, therapeutic agents, or macromolecules is distinct.

\* \* \* \* \*